(12) United States Patent
Sato et al.

(10) Patent No.: US 6,477,121 B1
(45) Date of Patent: Nov. 5, 2002

(54) APPARATUS AND DISK HOLDER FOR USE IN THE SAME

(75) Inventors: Nobuhiro Sato, Tokto (JP); Hideki Hayashi, Tokyo (JP)

(73) Assignee: Clarion Co., Ltd., Saitame-ken (JP)

( * ) Notice: Subject to any disclaimer, the term of this patent is extended or adjusted under 35 U.S.C. 154(b) by 132 days.

(21) Appl. No.: 09/690,070

(22) Filed: Oct. 16, 2000

Related U.S. Application Data

(62) Division of application No. 09/015,710, filed on Jan. 29, 1998, now Pat. No. 6,392,980.

(30) Foreign Application Priority Data

Jan. 31, 1997 (JP) .............................................. 9-18315
Mar. 31, 1997 (JP) .............................................. 9-79513

(51) Int. Cl.⁷ .......................... G11B 17/04; G11B 17/22
(52) U.S. Cl. ............................... 369/30.88; 369/30.85; 369/77.1; 369/191
(58) Field of Search ..................... 369/30.88, 30.85, 369/77.1, 191

(56) References Cited

U.S. PATENT DOCUMENTS

| | | | |
|---|---|---|---|
| 4,413,294 A | 11/1983 | Beijer | |
| 4,841,499 A | 6/1989 | Takahashi et al. | |
| 5,014,258 A | * 5/1991 | Takemasa et al. | 360/133 |
| 5,481,512 A | 1/1996 | Morioka et al. | |
| 5,544,148 A | 8/1996 | Nakamichi | |
| 5,555,239 A | 9/1996 | Takai et al. | |
| 5,768,247 A | 6/1998 | Kim et al. | |
| 6,141,310 A | * 10/2000 | Tanaka et al. | 369/75.2 |
| 6,246,643 B1 | * 6/2001 | Satoh et al. | 369/30.85 |
| 6,392,980 B1 | * 5/2002 | Sato et al. | 369/192 |

FOREIGN PATENT DOCUMENTS

| | | |
|---|---|---|
| DE | 19731501 | 2/1998 |
| EP | 063894 | 11/1982 |
| EP | 267538 | 8/1988 |
| EP | 0632444 | 1/1995 |
| EP | 685842 | 12/1995 |
| JP | 62-250549 | * 10/1987 |
| JP | 62-295257 | * 12/1987 |
| JP | 6320458 | 8/1988 |
| JP | 7320359 | 12/1995 |
| JP | 11-66680 | * 3/1999 |
| WO | 8803694 | 5/1988 |

* cited by examiner

*Primary Examiner*—William Klimowicz
(74) *Attorney, Agent, or Firm*—Price and Gess

(57) ABSTRACT

A disk apparatus has a playback unit. In the playback unit, a drive plate having thereon a turntable and a spindle motor is compulsively mechanically driven by drive cams of a first and second driving plates, and then mechanically locked at a lower position or upper position. A clamp arm having a clamper is driven toward the drive plate with a biasing force of a spring, and resiliently locked at an upper position or lower position. A disk engaging section for engaging in a disk hole of a disk is formed on the clamper. A projection which is adapted to project through the disk engaging section is formed on the turntable. The disk is well chucked and the disk apparatus is ensured to perform a stable operation.

5 Claims, 18 Drawing Sheets

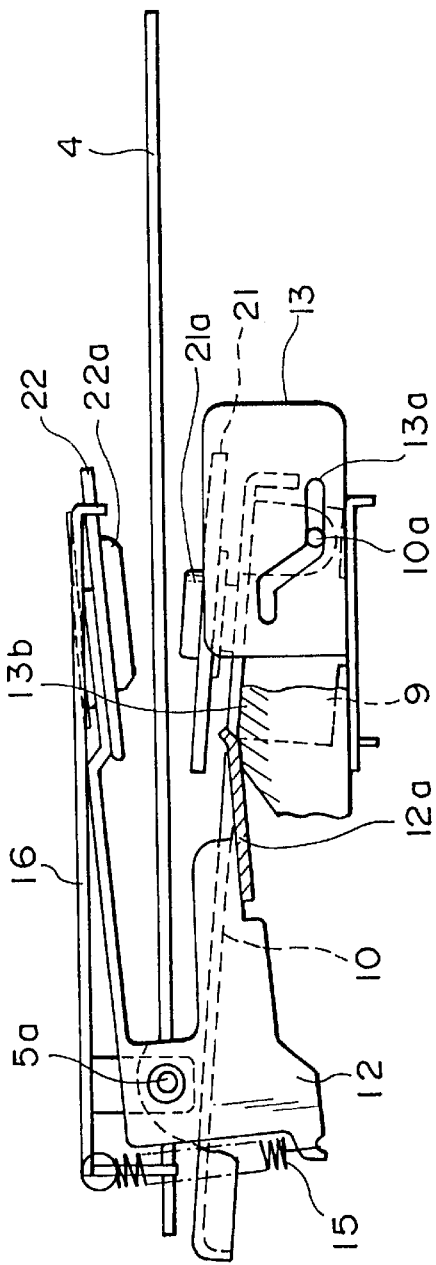
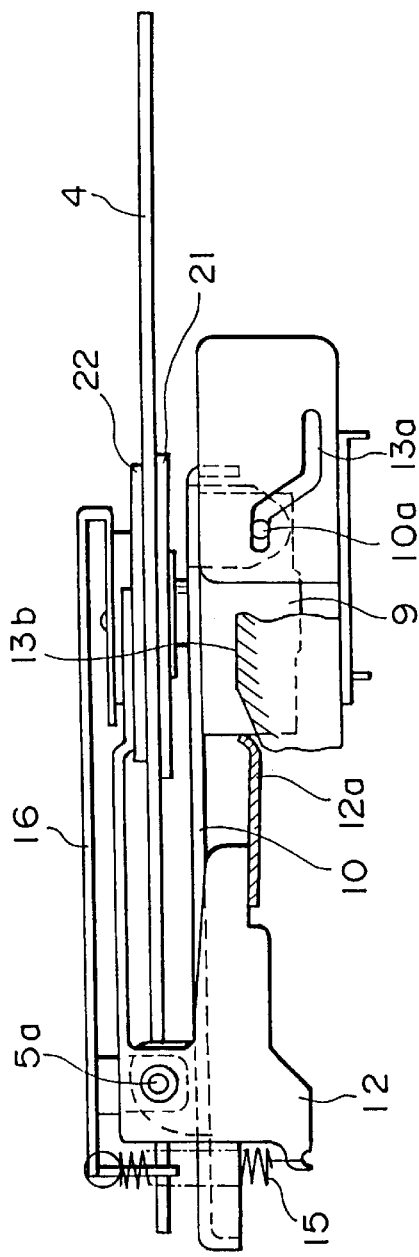

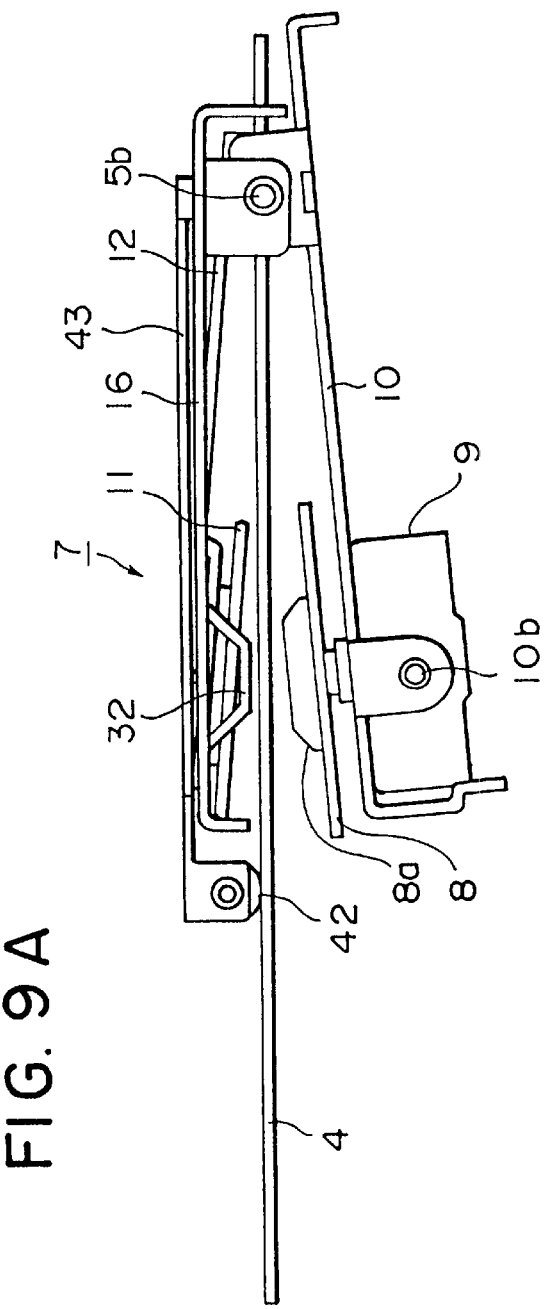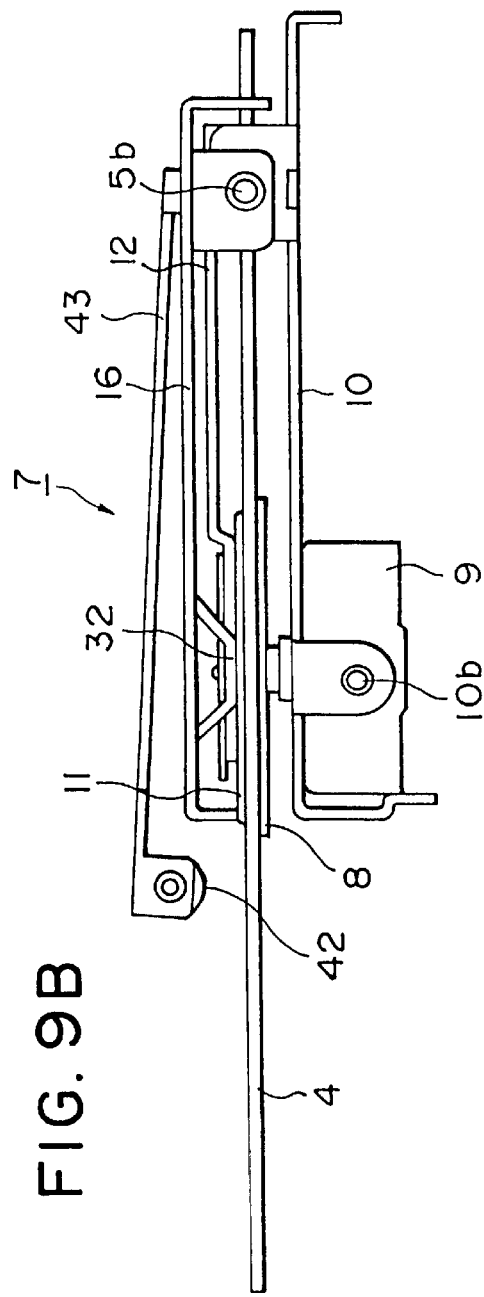

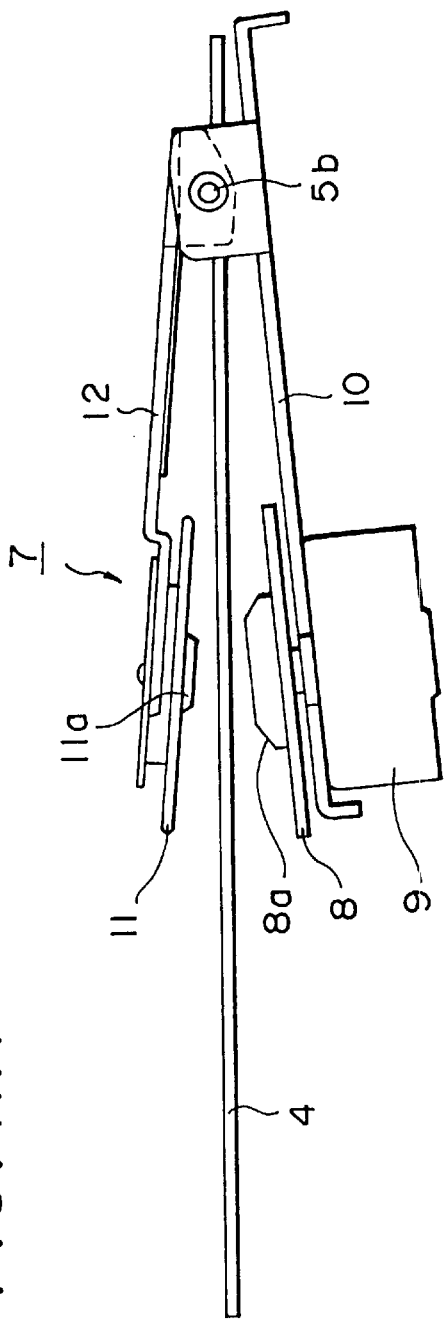
FIG. IIA
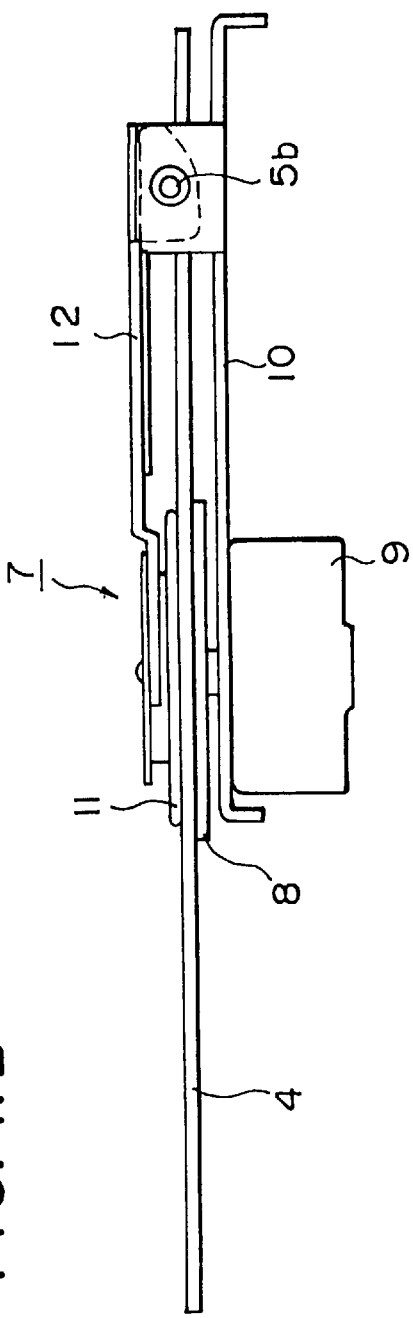
FIG. IIB

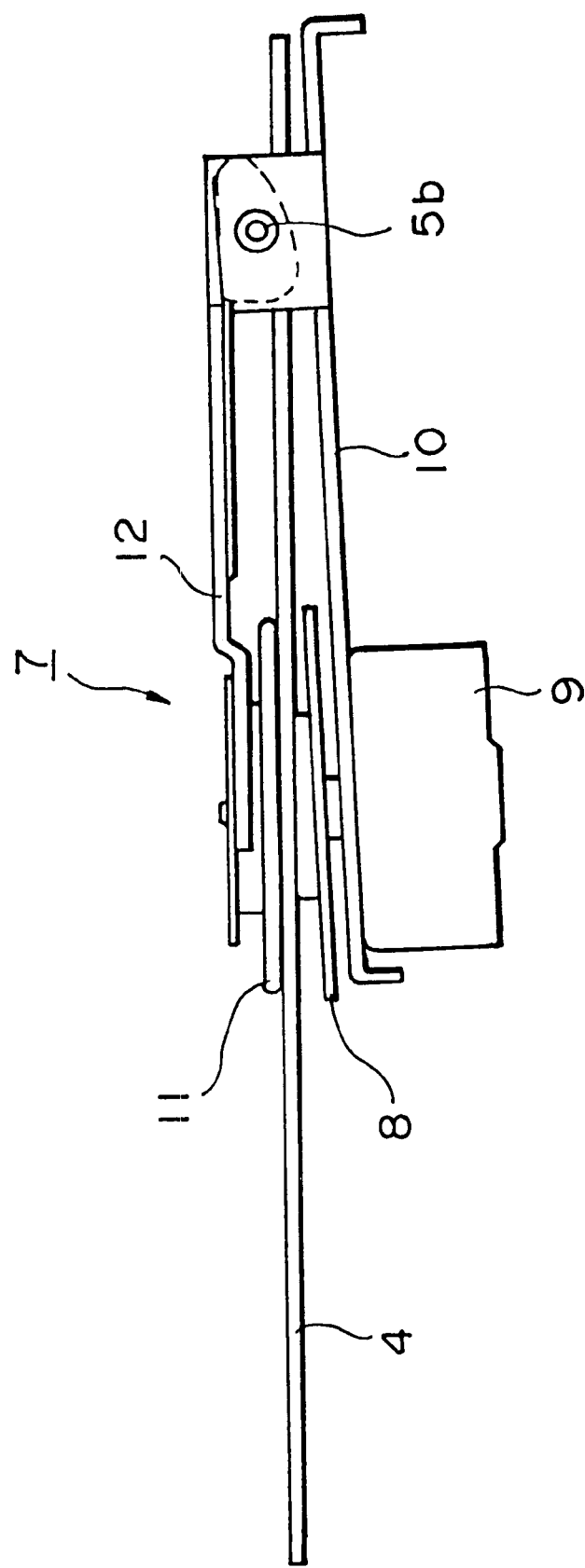

APPARATUS AND DISK HOLDER FOR USE IN THE SAME

This is a divisional application of U.S. Ser. No. 09/015,710, filed on Jan. 29, 1998, now U.S. Pat. No. 6,392,980 B1.

BACKGROUND OF THE INVENTION

1. Field of the Invention

The present invention relates to a disk apparatus for recording and reproducing information in which a disk is taken out of a disk holder, and relates to the disk holder for use in the disk apparatus.

2. Description of the Related Art

Recently, a disk apparatus such as a CD (Compact Disk) player of the type provided with a magazine accommodating therein a plurality of disks and adapted to automatically select and play a disk selected by a user from the plurality of disks has become more popular from a standpoint of simplifying disk exchange operations of the user as far as possible and improving a sense of use. In order to reproduce a plurality of disks sequentially at a common disk playback section for reproducing information recorded on each of the disks, the disk apparatuses such as mentioned above are configured to fetch a desired disk from the loaded magazine, transport the disk to a disk playback section, and return the disk into the magazine after completion of the reproduction.

Particularly, some of the above mentioned disk apparatuses employ a system using a magazine which accommodates a plurality of disk holders, each of which holds therein one disk, in an arrangement by which respective holders can be drawn out independently, and performing a loading operation of a disk from the inside of the magazine to the playback section and an ejecting operation of the disk from the playback section into the magazine by simply moving the holder forward and backward, respectively. In the disk apparatus based on this system, the disk holder holding therein a selected disk is transported to a position nearby the disk playback section by the moving forward operation, and returned into the magazine by the moving backward operation after the disk is received in a predetermined playback position. In order to eject the disk such as for exchanging the disk with another disk or ejecting the magazine, the empty disk holder is transported to a position nearby the disk playback section by the moving forward operation, then the disk holder is returned into the magazine with the disk held therein by the moving backward operation after the disk at the playback position is recovered in the holder. FIG. 10 shows a plan view of a conventional disk apparatus based on the system as mentioned above by way of example. Thus, as shown in FIG. 10, a magazine 2, which accommodate therein a plurality of disk holders 3 in a direction perpendicular to the surface of the paper on which the figure is drawn, is loaded in a magazine mounting section provided within a case 1 of the apparatus as shown in the right-hand part of the figure. Each of the disk holders 3 is configured so that a disk 4 is inserted thereto and held therein in the direction parallel to the main surface thereof, and each of the disk holder 3 is provided with an engaging section 3a for drawing at one end thereof.

Further, a lift unit 5 is movably supported in the vertical direction with respect to the case 1 of the apparatus as. shown in the right-hand part of the figure. This lift unit 5 contains a holder drawing member 6 for drawing the disk holder 3 and a playback unit 7 for reproducing the disk 4.

Among these components, the holder drawing member 6 is mounted on a chassis of the lift unit 5 a movably in the disk transporting direction, i.e. a horizontal direction in the figure, and a fingernail-shaped lug 6a which engages with the engaging section 3a is provided at one end of the holding unit drawing member 6. The lift unit 5 is moved upward or downward according to a disk selection instruction in order to adjust the height of the holder drawing member 6 to the height of the disk holder 3 accommodating therein the selected disk 4.

On the other hand, the playback unit 7 is configured as shown in FIGS. 11 illustrating side views of the playback unit 7. FIG. 11A shows a disk loading state and FIG. 11B shows a disk clamping state. As shown in FIGS. 11, the playback unit 7 comprises a drive plate 10 having a rotatable turntable 8 and a spindle motor 9 for rotating the same, a clamp arm 12 having a rotatable clamper 11, and the like. The drive plate 10 and the clamp arm 12 are pivotably mounted on a chassis of the lift unit 5 via a common axis 5a, 5b so that they can vertically pivot around the axis 5a, 5b in the direction opposite to each other. That is, as shown in FIG. 11A, when the drive plate 10 is positioned lower, the clamp arm 12 is positioned upper, thereby the turntable 8 and the clamper 11 are spaced for some distance, while, as shown in FIG. 11B, when the drive plate 10 is positioned upper, the clamp arm 12 is positioned lower, thereby the turntable 8 and the clamper 11 can move closer to each other to clamp the disk 4 therebetween.

More particularly, the drive plate 10 and the clamp arm 12 are typically driven based on such a system as mentioned below. The drive plate 10 is mechanically driven in force with a cam and positioned at a prescribed place every time after completion of disk chucking operation. The clamp arm 12 is biased toward the drive plate 10 with a biasing force of a spring, and the position of the clamp arm 12 is controlled in the direction of moving away from the drive plate 10 by a position control section provided at a part of the apparatus. The position control section for controlling the position of the clamp arm is provided, for example, at a part of a member having a cam which compulsively drives the drive plate.

The turntable 8 comprises a ring-shaped engaging section 8a at a center of a support surface thereof for supporting the main surface of the disk 4, and the engaging section 8a having an outer diameter which is approximately same as the disk hole diameter is engaged in the disk hole of the disk 4. This disk engaging section has a tapered portion for guiding the disk 4 at a terminal end thereof. The damper 11 comprises a projection 11a at a center of the support surface thereof for supporting the main surface of the disk 4, and the projection 11a is adapted to project through the ring of the disk engaging section 8a.

Disk loading operation of the disk apparatus shown in FIG. 10 having the configuration as mentioned above is as follows. First, the lift unit 5 is moved upward or downward according to a disk selection instruction in order to adjust the height of the holder drawing member 6 to the height of the disk holder 3 accommodating therein a selected disk 4. With the abovementioned state keeping, the disk holder 3 is drawn out from the inside of the magazine 2 by moving the holder drawing member 6 rightward in FIG. 10.

Next, when the disk holder 3 is drawn out to a prescribed position above the playback unit 7 and the disk 4 accommodated in the disk holder 3 is transported to the. playback position on the turntable 8 of the playback unit 7, the playback unit 7 is driven to effect the disk chucking operation. First, the disk chucking operation is performed when the turntable 8 and the clamper 11 is separated as shown in FIG. 11A, then the turntable 8 and the clamper 11 move closer to each other, thereby the disk playback unit is transferred to the disk clamping state as shown in FIG. 11B. In this case, the turntable 8 supports the main surface of the disk 4 on the support surface thereof, and operates to control the position of the disk 4 in the vertical direction (i.e. the direction along the rotation axis) as well as control the position of the disk 4 in the horizontal direction (i.e. the direction along the main surface) by engaging the disk engaging section 8a in the disk hole of the disk 4.

After completion of the disk chucking operation, the disk holder 3 is returned into the magazine 2 by moving the holder drawing member 6 leftward in FIG. 10. At this time, the disk 4 accommodated in the disk holder 3 is left in the playback unit 7 so as to be clamped between the turntable 8 and the clamper 1, therefore, only the empty disk holder is returned into the magazine 2.

Disk ejecting operation is provided as mentioned below. First, the empty disk holder 3 is drawn from the inside of the magazine 2 by moving the holder drawing member 6 leftward in FIG. 10 in response to the another disk selection instruction or the disk eject instruction. Subsequently, when this disk holder 3 is drawn to the prescribed position above the playback unit 7 and the disk 4 mounted on the turntable 8 is received in the disk holder 3, the playback unit 7 is driven to perform the disk chuck releasing operation. That is, the state as shown in FIG. 11B is transferred to the state as shown in FIG. 11A. After completion of the disk chuck releasing operation, the disk holder 3 receiving therein the disk 4 is returned into the magazine 2 by moving the holder drawing member 6 leftward in FIG. 10.

In the conventional disk apparatus in the foregoing, the turntable 8 is provided with a projection having an outer diameter which is approximately same as the inner diameter of the disk hole of the disk 4 in order to control the position of the disk 4 in the horizontal direction thereof by engaging the project in the inner diameter of the disk hole of the disk 4 supported on the turntable 8, the projection having a tapered portion at a terminal end thereof for guiding the disk 4.

When mounting the disk 4 on the turntable 8 having the abovementioned shape, if any burr or the like is present in the disk hole of the disk 4, the disk hole can be engaged with the tapered portion at a terminal end of the disk engaging section 8a of the turntable 8, therefore, the disk engaging section 8a can not be entirely inserted into the disk hole. In the case mentioned above, if the disk chucking operation is proceeded as it is, the disk 4 is clamped between the turntable 8 and the damper 11 with the disk 4 inclined. That is, the disk 4 is held inclined and afloat with respect to a normal height position (a reference plane) defined by the support surface of the turntable 8.

If the disk playback operation is processed in a bad chucking. condition such that the disk 4 is unstably clamped between the turntable 8 and the clamper 11 as shown in FIG. 12, the reproduction quality of the disk may be poor. Further, once the disk 4 is held inclined with respect to the turntable 8 as mentioned above, even if the disk 4 is well reproduced, the position of the disk 4 cannot be changed to the normal height position by means of the disk chuck releasing operation. The disk 4 is held still inclined and afloat with respect to the reference plane when the disk holder 3. receives the disk 4 after completion of the disk reproduction, so that there is a possibility that the disk holder 3 can not recover the disk 4.

These problems as in the foregoing are also present in various disk apparatuses to which a disk transporting mechanism including a moving member for transporting the disk such as the holder drawing member 6 shown in FIG. 10 and a disk playback section such as the playback unit 7 shown in FIG. 10 are substantially locked as in the case of the lift unit 5 shown in FIG. 10. Further, the similar problem as mentioned above is also present in a disk apparatus not using a magazine when the disk apparatus employs a system for drawing out the disk in the direction parallel to the main surface thereof and the disk transporting mechanism and when the disk playback section are substantially locked therein.

Further, there is present still another problem as mentioned below in the conventional disk apparatus. That is, in the conventional disk apparatus, when the disk mounted on the turntable is returned into the disk magazine, the disk holder is moved horizontally and the disk is recovered in the disk holder through the inserting portion thereof. The disk holder is inserted into grooves provided on both inner sides of the disk magazine. Considering the prevention of the disk vibration, it is necessary to make the groove narrow, which requires the higher positioning accuracy to insert the disk into the disk holder. However, if the disk is not properly held on the turntable or if the disk itself is deformed, the height difference is induced between the side face of the disk and the inserting portion of the disk holder. If such difference is present, there are possibilities that an end of the disk collide against an end of the disk holder on the inserting portion side thereof and that the disk holder can not recover the disk.

The problem mentioned above is addressed by increasing the clearance of the inserting portion of the disk holder, thereby an error caused by the height difference as in the foregoing is accommodated and the possibility that a trouble occurs is reduced. However, widening the inserting portion causes the increase of the thickness of the holder. Thus, it becomes necessary to vertically enlarge the magazine for accommodating a plurality of the disk holders arranged in stack, and, as a result, the disk apparatus has to be upsized in its entirety.

SUMMARY OF THE INVENTION

The present invention is suggested to eliminate the above-mentioned disadvantages of the prior art.

Accordingly, an object of the present invention is to provide a highly reliable disk apparatus, wherein a consistently reliable disk chucking operation is ensured, disk positioning operation can be performed easily and correctly, and subsequent disk playing operation and disk recovering operation are also favorably implemented.

Another object of the present invention is to provide a disk apparatus wherein the disk mounted on a playback or recording position can be reliably returned to the disk holding unit without increasing the apparatus in size.

Still another object of the present invention is to provide a disk holding unit which ensures reliable disk insertion and does not require upsizing of the disk apparatus.

In order to accomplish the objects in the foregoing, in accordance with a basic aspect of the present invention, the disk engaging section is eliminated from the mechanically locked rotating member in the playback section or the position control is compulsively performed on the main surface of the disk by a disk control section for the proper direction, thereby an intimate contact of the disk with the rotating member can be obtained, as a result, a consistently reliable chucking operation is ensured.

More specifically, in accordance with a first aspect of the present invention, the disk apparatus comprises a disk playback section, a chucking operation drive mechanism, and disk transporting means. Among them, the disk playback section comprises a first supporting member which has a first turning member for rotating a disk and supports a spindle motor for rotating the first rotating member, and a second supporting member which has a second turning member for clamping a disk in cooperation with the first rotating member. In the chucking operation drive mechanism, one of the first and second supporting members is driven in a chucking direction with a biasing force of a spring, and another one of the first and second supporting members is mechanically locked to a chucking position, thereby the disk is clamped between the first and the second rotating members. The disk transporting member comprises means for guiding the disk to a region between the first and second rotating members.

In addition to the configurations in the foregoing, the apparatus further features that the first and the second rotating members are configured as described below. One of the first and second rotating members which is provided on the supporting member driven by the biasing force of the spring includes a disk engaging section adapted to engage in the disk inner diameter, and the disk engaging section comprises an outer wall having a diameter approximately the same as an inner diameter of the disk and an inner wall which is formed inside of the outer wall. The other of the first and the second rotating member which is provided on the mechanically locked supporting member includes a projection which is adapted to project through the inside of the inner wall of the disk engaging section.

In the disk apparatus characterized as mentioned above, the disk engaging section is provided on the rotating member which is driven by using the biasing force of the spring rather than provided on the rotating member which is mechanically locked, thereby the disk is ensured to be brought into intimate contact with the mechanically locked rotating member during disk chucking operation. Therefore, a consistently reliable disk chucking operation is ensured.

In accordance with a second aspect of the present invention, the disk apparatus comprises a magazine loading section, a disk playback section, holding unit drawing means, moving means, and a chucking operation drive mechanism. Among them, the magazine loading section is configured to receive a magazine, the magazine can accommodate a plurality of disk holding units in an arrangement such that any disk holding unit can be drawn out independently, and the disk holding unit accommodates a disk inserted in the direction parallel to the main surface thereof. The disk playback section comprises the first supporting member which has a first rotating member for rotating a disk and supports a spindle motor for rotating the first rotating member, and the second supporting member which has a second rotating member for clamping the disk in cooperation with the first rotating member. The holding unit drawing means draws out a specified disk holding unit from the magazine loaded in the magazine loading section and guides the disk accommodated in the disk holding unit to the region between the first and the second rotating members, and the moving means moves the holding unit drawing means in the direction of arranging the disk holding units in the magazine. The chucking operation drive mechanism include a mechanism for driving one of the first and second supporting member in the chucking direction with a biasing force of a spring, and fixing the other one of the first and second supporting member to a chucking position, thereby allowing a disk to be clamped between the first and second rotating members.

In the disk apparatus as in the foregoing, the aforementioned first and second rotating members are configured as in the following. One of the first and second rotating members which is provided on the supporting member driven by using the spring biasing force includes a disk engaging section which comprises an outer wall having a diameter which is approximately the same as an inner diameter of a disk in order to engage with the disk inner diameter, and an inner wall formed inside of the outer wall. The other one of the first and second rotating member which is provided on the mechanically locked supporting member includes a projection which projects through the inside of the inner surface of the disk engaging section.

In the disk apparatus in accordance with the present invention characterized as mentioned above, the disk engaging section is provided on the rotating member which is driven by using the biasing force of the spring rather than provided on the rotating member which is mechanically locked, thereby the disk is ensured to be brought into intimate contact with the mechanically locked rotating member during disk chucking operation. Therefore, a consistently reliable disk chucking operation is ensured.

The abovementioned disk apparatus in accordance with the second aspect may by modified as follows.

At least in the vicinity of the supporting member of the first and second supporting members which is driven by using the spring biasing force, there is provided a disk control section for controlling the position of a main surface of a disk accommodated in the disk holding unit when the disk holding unit is drawn out to a position where the disk held in the disk holding unit can be chucked.

According to the characteristics in the foregoing, the disk control section can compulsively control the position of the main surface of the disk in a proper direction using the spring biasing force during the disk chucking operation. Therefore, consistently reliable disk chucking operation is ensured.

Alternatively, the disk control section may be provided on a moving member which moves closer to the main surface of the disk accommodated in the disk holding unit when the holding unit accommodating a disk is drawn out to the position where the disk can be chucked. As this moving member, for example, the first or second supporting member itself may be used, or the other moving member which is operatively associated with these supporting members may be used.

When the disk control member such as mentioned above is used, the motion of the moving member approaching to the disk main surface can be used to compulsively control the position of the disk main surface in the proper direction.

Further, in accordance with a third aspect of the present invention, reliable disk insertion is provided without upsizing the disk apparatus.

That is, in accordance with the third aspect of the present invention, a disk apparatus comprising a disk holding unit having an inserting portion through which a disk can be loaded or unloaded and reproducing means and/or recording means for reproducing and/or recording the information stored in the disk which is extracted from the disk holding unit, wherein the disk holding unit is provided so that it can be positioned to a position where an end of the disk during being played or recorded by the reproducing means or the recording means and an end of the disk holding unit at the inserting portion overlap one another.

In the disk apparatus configured as mentioned above, the end of the disk during playing or recording and the end of the disk holding unit overlap one another, therefore the disk does not completely separate from the inserting portion. Accordingly, if the height difference occurs between the end of the disk and the inserting portion, the end of the disk is made contact with and controlled by the end of the disk holding unit on the inserting portion side thereof and prevented from coming apart from the inserting portion, which ensures reliable disk insertion when returning the disk into the disk holding unit.

In the disk apparatus as mentioned above, a guide piece formed from a thin wall may provided at the end of the disk holding unit which overlaps the end of the disk. is provided.

When such a guide piece is provided on the end of the disk holding unit, the end of the disk holding unit which overlaps the end of the disk is a thin wall guide piece, thereby the clearance of the inserting portion increases,. and that the end of the disk during playing or recording and. the end of the disk holding unit become hard to contact to each other.

In accordance with a fourth aspect of the present invention, there is provided a disk holding unit having an inserting portion through which a disk can be loaded or unloaded in the direction parallel to the main surface thereof, wherein a guide member is provided at one end of the holding unit on the inserting portion side thereof, the guide member opening when the disk is inserted and becoming narrow after accommodation of the disk.

In the disk holding unit as mentioned above, the guide member opens when the disk is returned into the disk holding unit and the clearance of the inserting portion is broadened. Accordingly, if any height difference occurs between the disk end and the inserting portion, an error caused by the height difference as in the foregoing is accommodated by the opening of the inserting portion, thereby reliable disk insertion is ensured. The guide member closes after the disk is accommodated in the disk holding unit, and the inserting portion becomes narrow. Accordingly, there is no need to increase the thickness of each disk holding unit, as a result, the disk apparatus can be rid of upsizing in its entirety.

In accordance with a fifth aspect of the present invention, there is provided a disk holding unit which has an inserting portion through which a disk can be loaded or unloaded in the direction parallel to the main surface thereof and which is dismountably loaded in the disk magazine, wherein a guide member is provided at an end of the disk holding unit on the inserting portion side thereof, the guide member opening when the end is drawn from the disk magazine and becoming narrow when the end is accommodated in the disk magazine.

In the disk holding unit in accordance with the fifth aspect, the guide member opens when the disk holding unit is drawn from the disk magazine for returning the disk into the disk holding unit and the clearance of the inserting portion is broaden. Accordingly, if any height difference occurs between the disk end and the inserting portion, an error caused by the height difference is accommodated by the opening of the inserting portion. Further, once the disk holding unit is accommodated in the disk magazine, the guide member closes and the clearance of the inserting portion becomes narrow. Accordingly, there is no need to increase the thickness of each disk holding unit, and no need to increase the size of the magazine for accommodating the disk holding units therein, as a result, the disk apparatus can be rid of upsizing in its entirety.

In accordance with the fifth aspect of the present invention, the abovementioned guide member may have a butting portion which butts against another disk holding unit or the inside of the disk magazine, thereby narrowing the inserting portion.

In the case where the guide member as mentioned above is used, the inserting portion is narrowed by the butting portion when the disk holding unit is accommodated in the disk magazine, thereby the butting portion prevent the disk from popping out of the disk holding unit.

The disk holding unit in accordance with the fourth or fifth aspect may be formed of a resilient material in its entirety or in part. When such a material is used, the guide member is allowed to automatically open and close owing to the resiliency thereof.

The above and other objects, features and advantages of the present invention will become apparent from the following detailed description of illustrative embodiments thereof to be read in conjunction with the accompanying drawings.

BRIEF DESCRIPTION OF THE DRAWINGS

FIG. 2 are views of the playback unit and the first drive plate shown in FIG. 1: wherein FIG. 2A is a side view of the playback unit and first drive plate in a disk loading state both of which are incorporated in the apparatus shown in FIG. 1; FIG. 2B is a side view of the playback unit and the first drive plate in a disk clamping state;

FIG. 9A is a side view of the disk apparatus in a disk loading state shown in FIG. 8; FIG. 9B is a side view of the same disk apparatus in a disk clamping state;

FIG. 11 are views showing a playback unit shown in FIG. 10: wherein FIG. 11A shows a side view of the playback unit in a disk loading state which is incorporated into a conventional disk apparatus shown in FIG. 8; FIG. 11B is a side view of the same playback unit in a disk clamping state;

FIG. 12 is a side view of the playback unit shown in FIG. 10, particularly illustrating a inadequate chucking condition;

DESCRIPTION OF THE PREFERRED EMBODIMENTS

Disk apparatuses in accordance with the first and second aspects of the present invention will now be described. concretely. Each embodiment described below is a preferred embodiment of a disk apparatus of the type in which a holder drawing member 6 for drawing out a disk holder and a playback unit 7 for reproducing a disk 4 are movably mounted on a chassis of a lift unit 5.

First Embodiment

[Configuration]

Figure 1:
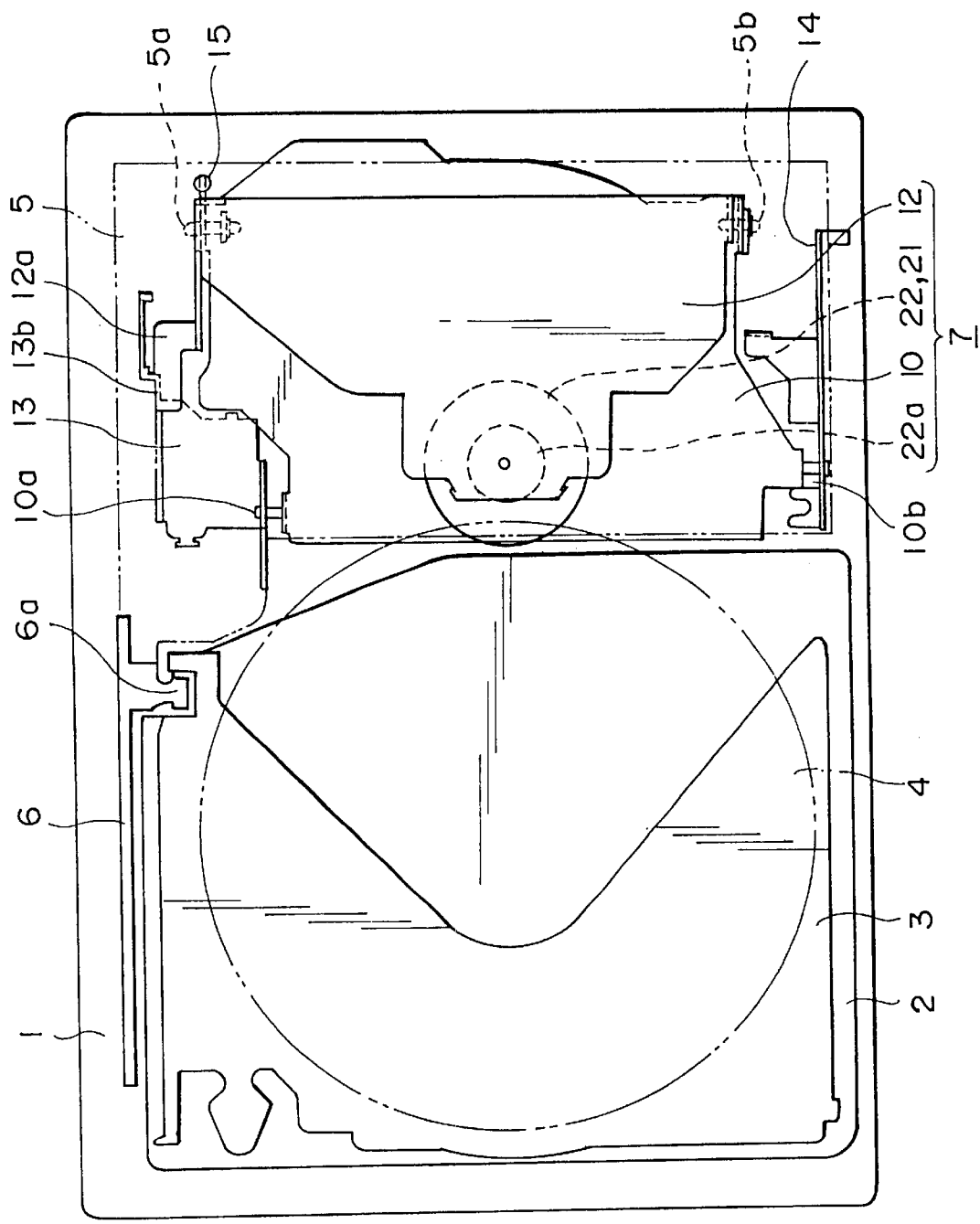
FIG. 1 is a plan view of a first embodiment of a disk apparatus in accordance with the present invention, particularly illustrating a plurality of main members which are located at their initial position.

FIG. 1 shows a plan view of first embodiment of a disk apparatus in accordance with the present invention, particularly illustrating a plurality of main members which are located at their initial position. That is, as shown in FIG. 1, a magazine 2 is loaded in a magazine loading section which is provided in a case 1 of the apparatus as shown in the left-hand part of FIG. 1, and the magazine 2 accommodates a vertically stacked plural disk holders (disk holding unit) 3. Each of the disk holders 3 is configured so that a disk 4 is inserted thereto and held therein in the direction parallel to the main surface thereof, and each of the disk holder 3 is provided with an engaging section 3a for drawing at one end thereof.

Further, a lift unit (moving means) 5 is movably supported with respect to the case 1 of the apparatus as shown in the right-hand part of the figure. This lift unit 5 contains a holder drawing member (holding unit drawing member) 6 for drawing the disk holder 3, a playback unit (disk playback section) 7 for reproducing the disk 4, and a first and second driving plates 13, 14 for driving the playback unit 7.

Among these components, the holder drawing member 6 is mounted on the chassis of the lift unit 5 movably in the disk transporting direction, i.e. a horizontal direction in the figure, and a fingernail-shaped lug 6a which engages with the engaging section 3a is provided at one end of the holder drawing member 6. The lift unit 5 is moved upward or downward according to a disk selection instruction in order to adjust the height of the holder drawing member 6 to the height of the disk holder 3 accommodating therein the selected disk 4.

On the other hand, the playback unit 7 is configured as shown in FIGS. 2. FIGS. 2 are side views of the playback unit 7 and the first driving plate 13: FIG. 2A shows a disk loading state and FIG. 2B shows a disk clamping state. As shown in FIGS. 2, the playback unit 7 comprises a drive plate 10 (first supporting member) having a rotatable turntable (first rotating member) .21 and a spindle motor 9 for rotating the same, a clamp arm (second supporting member) 12 having a rotatable clamper (second rotating member) 11 in accordance with the present invention, and the like.

The drive plate 10 and the clamp arm 12 are pivotably mounted on a chassis of the lift unit 5 via common axis 5a, 5b so that they can vertically pivot around the axis 5a, 5b, and the clamp arm 12 is biased by a spring 15 in the direction that the damper 22 approaches to the turntable 21.

Referring to FIG. 2, the spring 15 is mounted between an upper plate 16 which forms a part of a chassis of the lift unit 5 and a clamp arm 12. Further, the axes 5a, 5b around which the drive plate 10 and the clamp arm 12 are pivotably mounted is also mounted on this upper plate 16.

As shown in FIG. 1, the first and the second driving plates 13, 14 is configured to slide in the horizontal direction of the figure to drive the drive plate 10 vertically, thereby the disk chucking operation is effected. These drive plates 13, 14 are connected by a link not shown, and adapted to reciprocate in the opposite direction to each other. A driving mechanism of the playback unit by means of these drive plates 13, 14 will now be described.

As shown in FIG. 1, driving pins 10a, 10b are provided at each side of a rotatable end of the drive plate 10. On the other hand, as shown in FIG. 2, a grooved cam 13a for driving is formed on one side wall of the first driving plate 13, and the engaging pin 10a of the drive plate 10 is inserted into the grooved cam 13a. A similar grooved cam is also formed on the second driving plate 14 shown in FIG. 1, and the other engaging pin 10b of the drive plate 10 is inserted thereto. That is, as shown in FIGS. 2A and 2B, the drive plate 10 is adapted to vertically pivot depending on the horizontal motion of the first and second driving plates 13, 14 shown in FIG. 1.

Further, as shown in FIG. 1, an engaging section 12a for controlling a position is provided at one end of the clamp arm 12. On the other hand, a position control section 13b comprising a sloped surface for guiding and a horizontal surface for controlling a position is formed on the upper part of the side wall of the first driving plate 13 on which the grooved cam 13a is not formed, and the engaging section 12 a of the clamping arm 12 is adapted to engage with the position control section 13b by the biasing force of the spring 15. In FIG. 2, only a part around the position control section 13b is shown for the side wall having the, position control section of the first driving plate 13, from the viewpoint of simplifying the drawing.

Owing to the configuration between the clamp arm 12 and the first driving plate 13 as mentioned above, when the drive plate 10 is located at a lower position as shown in FIG. 2A depending on the horizontal motion of the first driving plate 13, the engaging section 12a of the clamp arm 12 is placed on the horizontal surface of the position control section 12b, thereby the clamp arm 12 is located at an upper position. Then, as shown in FIG. 2B, when the drive plate 10 moves upward, the engaging section 12a of the clamp arm 12 moves down along the sloped surface of the position control section by means of the biasing force of the spring, thereby the clamp arm 12 moves downward.

As mentioned above, in the present embodiment, the clamp arm is configured to be operatively associated with the vertical pivot of the drive plated and pivoted in the opposite direction thereon. Then the drive plate 10 is adapted to be mechanically driven in force by the driving cams of the first and second driving plates 13, 14 and mechanically locked to the lower position shown in FIG. 2A or the upper position shown in FIG. 2B. On the other hand, the clamp arm 12 is adapted to drive toward the drive plate 10 with the biasing force of the spring 15 and resiliently locked at the upper position shown in FIG. 2A or at the lower position shown in FIG. 2B.

Figure 3A:
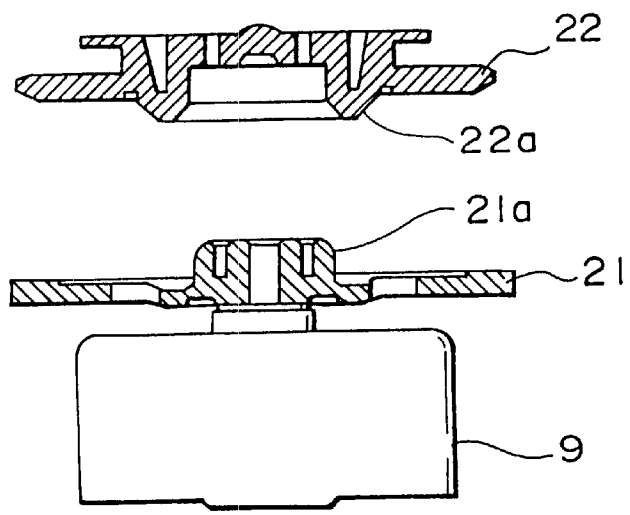
FIG. 3A is a sectional view showing the turntable and damper of the disk apparatus. shown in FIG. 1.
Figure 3B:
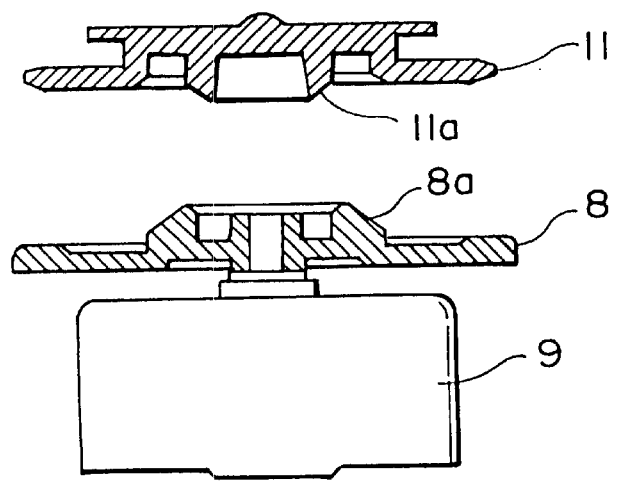
FIG. 3B is a sectional view of a conventional turntable and a conventional clamper for comparison.

Further, in the present embodiment, the turntable 21 and the damper 22 are configured as shown in FIG. 3A. FIG. 3B shows the conventional turntable 8 and damper 11 for the sake of comparison. As shown in FIG. 3B, the disk engaging section 8a is formed on the turntable 8 in conventional, however, in the present embodiment, the disk engaging section 22a is formed on the clamper 22 as shown in FIG. 3A.

That is, the clamper 22 is provided with a ring-like disk engaging section 22a adapted to engage in a disk hole of the disk 4 at the center of the supporting surface for supporting the main surface of the disk 4 the clamper 22, the disk engaging section 22a comprises an outer wall having a diameter approximately same as an inner diameter of the disk and an inner wall which is formed inside of the outer wall. This disk engaging section 22a has a tapered portion for guiding the disk 4 at a terminal end thereof. Besides, a projection 21a is formed on the turntable 21 at a center of the support surface thereof for supporting the main surface of the disk 4, and the projection 21a is adapted to project through the ring of the disk engaging section 22a.

Figure 10:
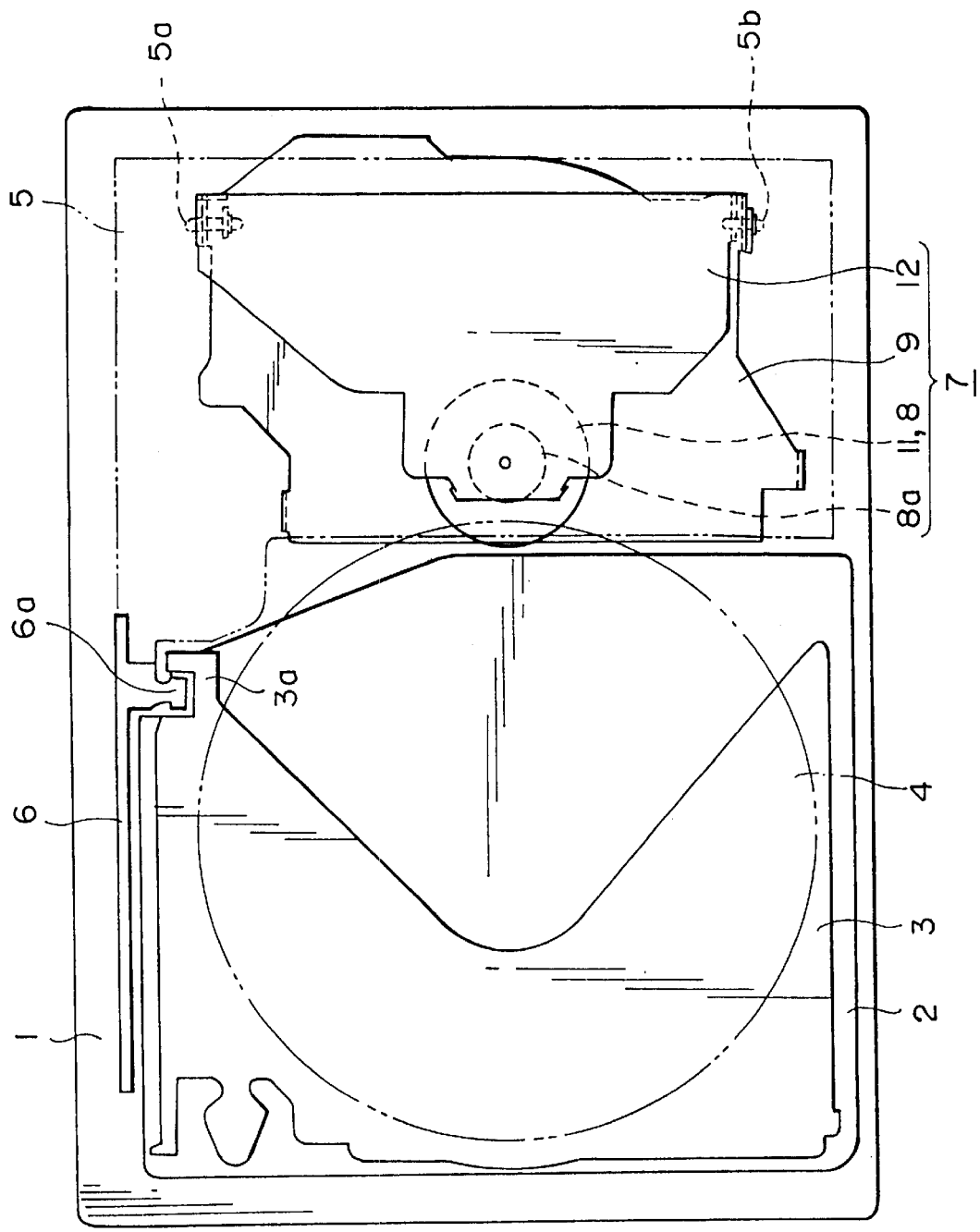
FIG. 10 is a plan view of a conventional disk apparatus by way of example.

Disk loading operation of the disk apparatus shown in FIG. 10 having the abovementioned configuration is as in the followings. First, the lift unit 5 is moved upward or downward according to a disk selection instruction in order to adjust the height of the holder drawing member 6 to the height of the disk holder 3 accommodating therein a selected disk 4. With the abovementioned state keeping, the disk holder 3 is drawn out from the inside of the magazine 2 by moving the holder drawing member 6 rightward in FIG. 10.

Next, when the disk holder 3 is drawn out to a prescribed position above the playback unit 7 and the disk 4 accommodated in the disk holder 3 is transported to the playback position on the turntable 8 of the playback unit 7, the playback unit 7 is driven to effect the disk chucking operation. First, the disk chucking operation is performed when the turntable 8 and the damper 11 is separated as shown in FIG. 11A, then the turntable 8 and the clamper 11 move closer to each other, thereby the disk playback unit is transferred to the disk clamping state as shown in FIG. 11B. In this case, the turntable8 supports the main surface of the disk 4 on the support surface thereof, and operates to control the position of the disk 4 in the vertical direction (i.e. the direction along the rotation axis) as well as control the position of the disk 4 in the horizontal direction (i.e. the direction along the main surface) by engaging the disk engaging section 8a in the disk hole of the disk 4.

[Operation]

In accordance with the disk apparatus having the abovementioned configuration, by virtue of the shape of the turntable 21 and the damper 22, the disk can be positioned easily and correctly when chucking the disk during the disk loading operation. A brief description of the disk loading operation of the disk apparatus in accordance with the present invention will be given below.

When loading a disk, first, the lift unit 5 is moved upward or downward according to the disk selection instruction in order to adjust the height of the holder drawing member 6 to the height of the disk holder 3 accommodating therein the selected disk 4. With keeping this state, the disk holder 3 is drawn from the magazine 2 by moving the holder drawing member 6 rightward in FIG. 1.

Subsequently, when the disk holder 3 is moved to a prescribed position above the playback unit 7 and the disk 4 accommodated in the disk holder 3 is transported to the playback position on the turntable 21 of the playback unit 7, the playback unit 7 is driven to effect the disk chucking operation. That is, the drive plate 10 located at the lower position and the clamp arm 12 located at the upper position as shown in FIG. 2A are pivoted upward and downward respectively by moving the first driving plate 13 shown in FIG. 1 is moved leftward in FIG. 1 (rightward in FIG. 2) and the second driving plate 14 is move rightward in FIG. 1, thereby the disk clamping state as shown in FIG. 2B is brought about.

In this case, the drive plate 10 is mechanically driven the driving cams of the first and second driving plates 13, 14 in force and reaches to the upper position shown in FIG. 2B, then is mechanically locked at this position by the driving plates 13, 14. In addition, the clamp arm 12 is driven by the biasing force of the spring 15 and reaches the lower position shown in FIG. 2B, then is locked at this position by the biasing force of the spring 15.

Figure 4A:
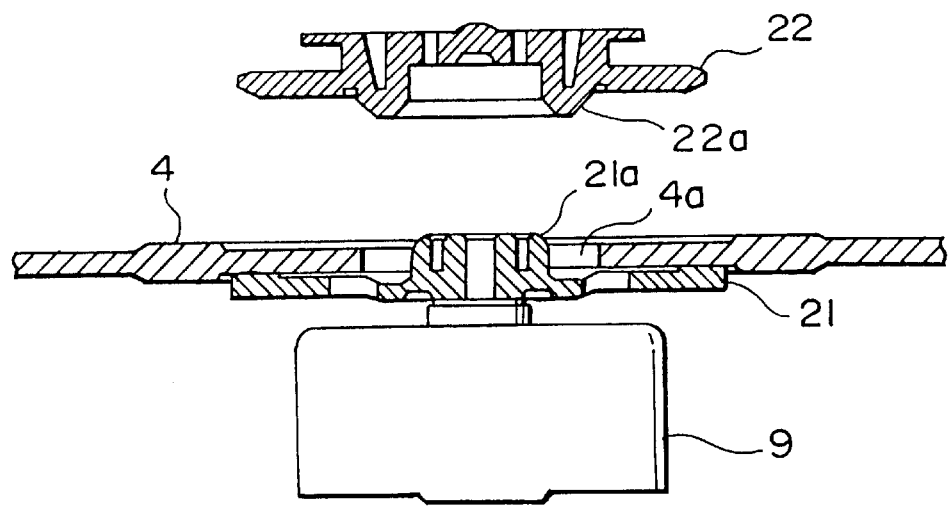
FIG. 4A is a sectional view showing the state in which a disk is properly supported on the turntable shown in FIG. 3A.
Figure 4B:
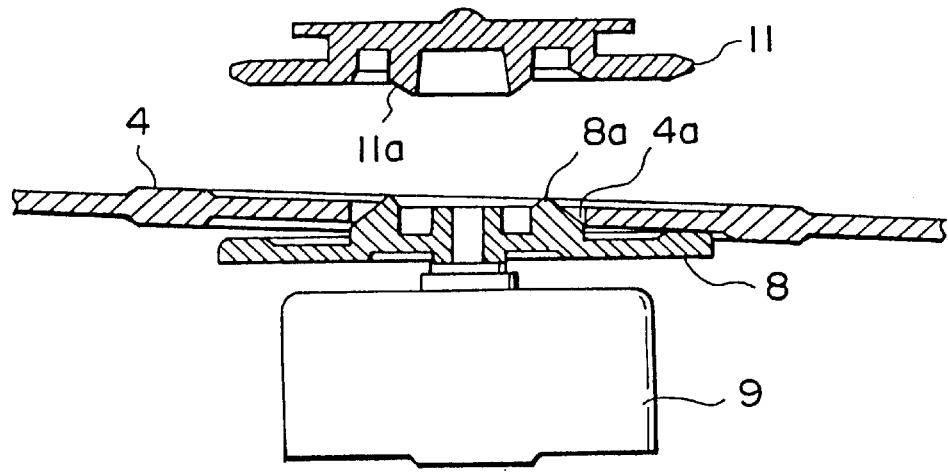
FIG. 4B is a sectional view showing the state in which a disk is caught by the conventional disk inserting portion shown in FIG. 3B for comparison.

During the disk chucking operation as mentioned above, the turntable 21 and the clamper 22 in accordance with the present invention provide a reliable disk chucking operation as mentioned below and properly controls the position of the disk 4. First, the turntable 21 in accordance with the present invention supports the lower main surface of the disk 4 on the supporting surface thereof as shown in FIG. 4A, and control the position of the disk 4 in the direction of height (in the direction along the rotation axis). In this case, the projection 21a of the turntable 21 is sufficiently smaller than the diameter of the disk hole 4a of the disk 4, the disk 4 is properly supported on the supporting surface of the turntable 21 without caught by the projection 21a. That is, the disk 4 is properly held on the reference plane defined by the supporting surface of the turntable 21. FIG. 4B shows a state in which the disk 4 is caught by the disk engaging section 8a of the conventional turntable 8 for the sake of comparison.

The damper 22 in accordance with the present invention is driven toward the turntable 21 by the biasing force of the spring 15 and engages in the disk hole 4a of the disk 4 by means of the disk engaging section 22a thereof, thereby controls the position of the disk 4 in the horizontal direction (the main surface direction). That is, as the disk 4 is properly supported on the reference plane on the turntable 21, the disk engaging section 22 of the damper 22 is guided to the disk hole 4a of the disk 4 by pressing the tapered portion at the terminal end thereof, therefore, the disk engaging section 22 can be engaged in the disk hole 4a without any obstruction. Thus, the disk engaging section 22a of the damper 22 can sufficiently control the position of the disk 4 in the direction of the main surface thereof. Further, the clamper 22 controls the position of the disk 4 in the direction of the upper main surface of the disk 4 and presses the upper main surface of the disk 4 through the supporting surface thereof with the biasing force of the spring 15 in order to bring the disk 4 into intimate contact with the supporting surface of the turntable 21.

After completion of the disk chucking operation, the disk holder 3 is returned into the magazine 2 by moving the holder drawing member 6 leftward in FIG. 1. In this case, as the disk 4 held in the disk holder 3 is left in the playback unit 7 with clamped between the turntable 21 and the clamper 22, only the empty holder 3 is returned into the magazine 2.

[Effects]

As mentioned above, in accordance with the present embodiment, the disk 4 is ensured to be brought into intimate contact with the turntable 21 by providing the disk engaging section 22a on the clamper 22 which is driven by the biasing force of the spring rather than providing the disk engaging section on the turntable which is mechanically locked, therefore, consistently reliable disk chucking operation is ensured. Accordingly, as the disk 4 can be easily and properly positioned both in the vertical direction and the horizontal direction, subsequent operations such as disk reproducing operation and disk recovering operation are also favorably implemented, thereby the operative reliability of the apparatus can be improved.

Further, if the disk engaging section 22a of the clamper 22 can not sufficiently engage in the disk hole 4a due to burrs in the disk hole 4a (that is, in the state in which the clamper 22 is afloat), the disk 4 can be brought into proper intimate contact with at least the turntable21 to be mechanically locked. Accordingly, in such a case, no obstruction is also encountered for disk recovering operation.

Second Embodiment

[Configuration]

Figure 5:
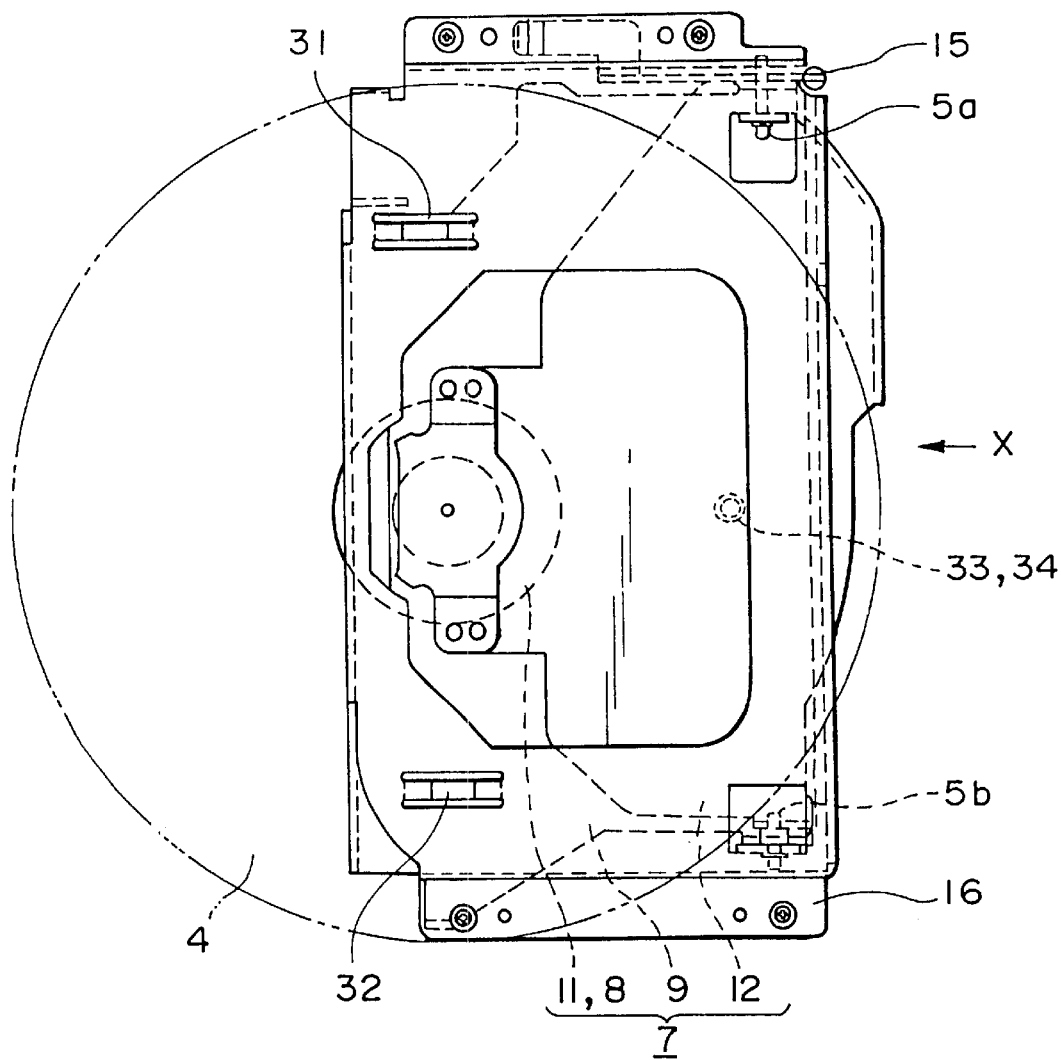
FIG.5 is a plan view of a second embodiment of a disk apparatus in accordance with the present invention, particularly illustrating a plurality of main members which are located at their initial position.
Figure 6:
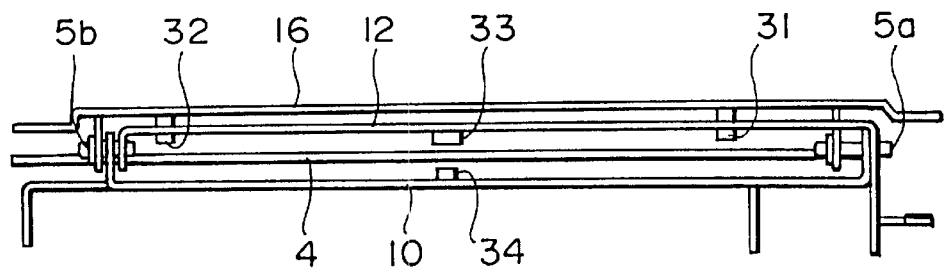
FIG. 6 is a diagram viewed from a direction of an arrow "X" in FIG. 5, particularly illustrating a disk control section.
Figure 7A:
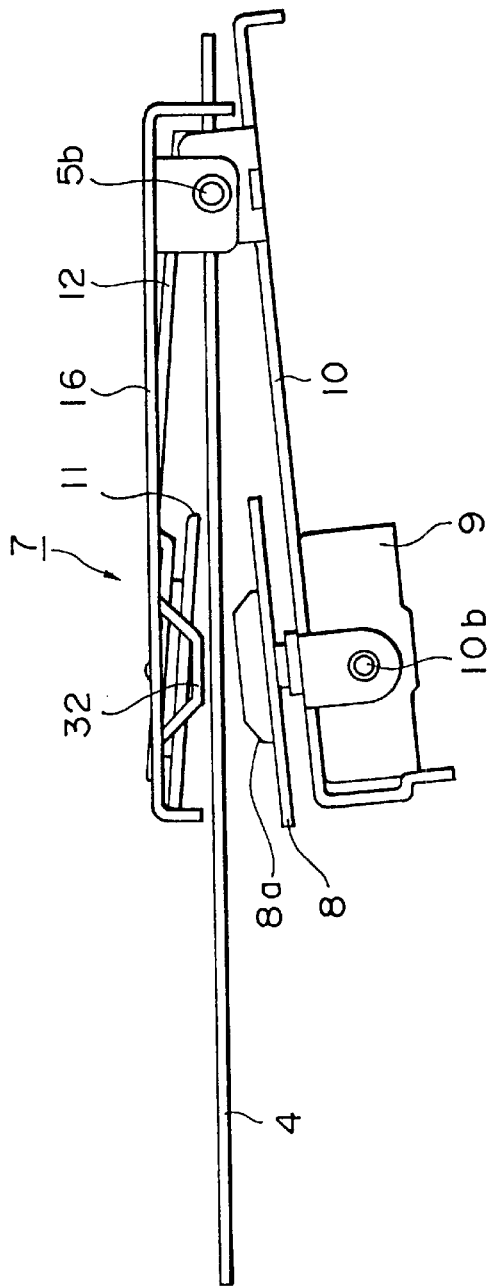
FIG. 7A is a side view of the disk apparatus in a disk loading state shown in FIG. 5.
Figure 7B:
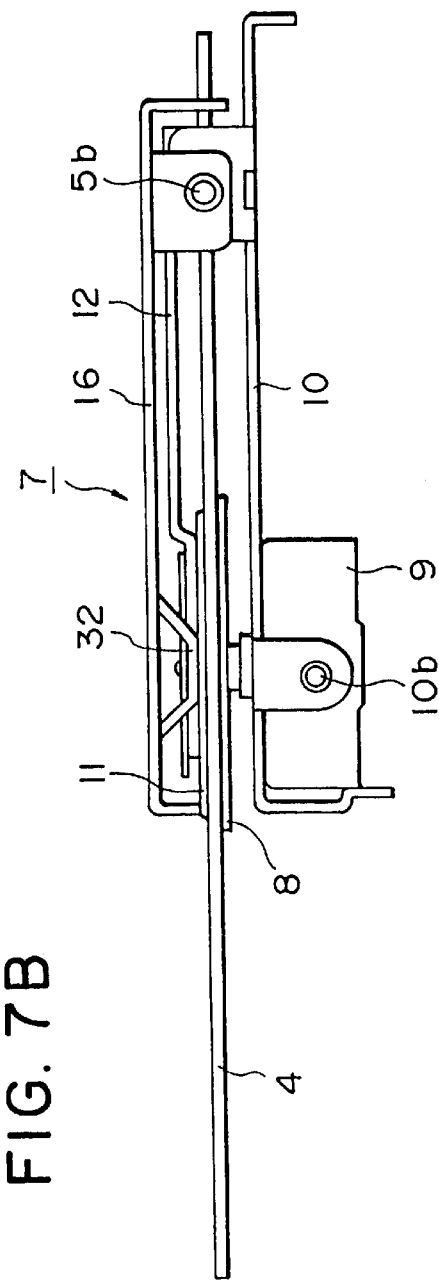
FIG. 7B is a side view of the same disk apparatus in a disk clamping state.

FIG. 5 is a plan view of a second embodiment of a disk apparatus in accordance with the present invention, particularly schematically illustrating only a plurality of main members which are located at their initial position. Beside, FIG. 6 is a diagram viewed from a direction of an arrow "X" in FIG. 5, wherein some members such as a turntable, a clamper, and the like are not shown for clearly illustrate a disk control section in accordance with the present invention. Further, FIGS. 7A and 7B are side views of the disk apparatuses in a disk loading state and in a disk clamping state, respectively. As the present embodiment substantially has a similar configuration to that of the first embodiment, only the points which are different from the first embodiment will be described below.

Referring to FIG. 7A, the present embodiment uses a conventional turntable 8 and clamper 11 as shown in FIG. 11A or FIG. 3B are used. Further, in the present embodiment, a pair of disk control sections 31, 32 for controlling the position of the main surface of a disk 4 is provided to extend downward at both sides of the turntable 8 in a upper plate 16 which forms a part of a lift unit 5 (FIG. 1) as shown in FIG. 5 and FIG. 6. Further, at center positions of the clamp arm 12 and the drive plate 10 between the axes 5a, 5b, a pair of disk control sections 33, 34 for controlling the position of the main surface of a disk 4 are provided so that they extend downward and upward respectively and are opposed to each other.

In this case, as shown in FIG. 6, each of disk control sections 31 to 33 which extend downward are formed so that the extended end thereof extends over the lower surface of the clamp arm 12 to be close vicinity to the upper main surface of the disk 4. More particularly, each of the disk control sections 31 to 34 is configured to have a small clearance between the projected end surface of each of the disk control sections 31 to 34 and the main surface of the disk 4 under such a condition that the disk 4 is properly supported on the reference plane as shown in FIG. 7B.

By the way, as the upper plate 16 is a fixed member relative to the configuration (lift unit 5) including the playback unit 7, the disk control sections 31, 32 provided on this upper plate 15 are located at constant positions with respect to the reference plane of the disk 4. On the other hand, the clamp arm 12 and the drive plate 10 are moving members which can be pivoted relative to the lift unit 5, the position of the disk control sections 33, 34 to the reference plane of the disk 4 are changed as the clamp arm 12 and the drive plate 10 rotates. Accordingly, the clearances between these disk control sections 33, 34 and the main surface of the disk 4 are set to be appropriate values in the disk clamping state as shown in FIG. 7B. The other parts are configured quite similarly to the first embodiment as in the forgoing.

[Operation]

In accordance with the present embodiment having the configuration as mentioned above, if the disk 4 is inclined during the disk chucking operation, at least one of the disk control sections 31 to 34 comes into contact with the main surface of the disk 4, and the least one of the disk control sections 31 to 34 which is contacted to the disk 4 compulsively presses the main surface of the disk in the proper horizontal direction. That is, the inclination of the disk 4 can be kept within the allowable range that the good chucking operation is ensured by compulsively controlling the position of the main surface of the disk 4 by the disk control sections 31 to 34. Therefore, when the combination of the conventional shape turntable 8 and clamper 11 is used, the disk 4 can be engaged with the disk engaging section 8a of the turntable 8 without trouble and consistently reliable disk chucking operation is ensured.

[Effects]

As mentioned above, in accordance with the present embodiment, the position of the main surface of the disk 4 can be compulsively controlled in the proper horizontal direction during the disk chucking operation by the disk control sections 31 to 34 provided on the upper plate 16 or on the clamp arm 12 and the drive plate 10 with the biasing force of the spring 15, therefore consistently reliable disk chucking operation is ensured. Accordingly, as the positioning of the disk 4 in the vertical direction and horizontal direction can be performed easily and precisely, subsequent operations such as disk reproducing operation and disk recovering operation are also favorably implemented, thereby the operative reliability of the apparatus can be improved.

Third Embodiment

[Configuration]

Figure 8:
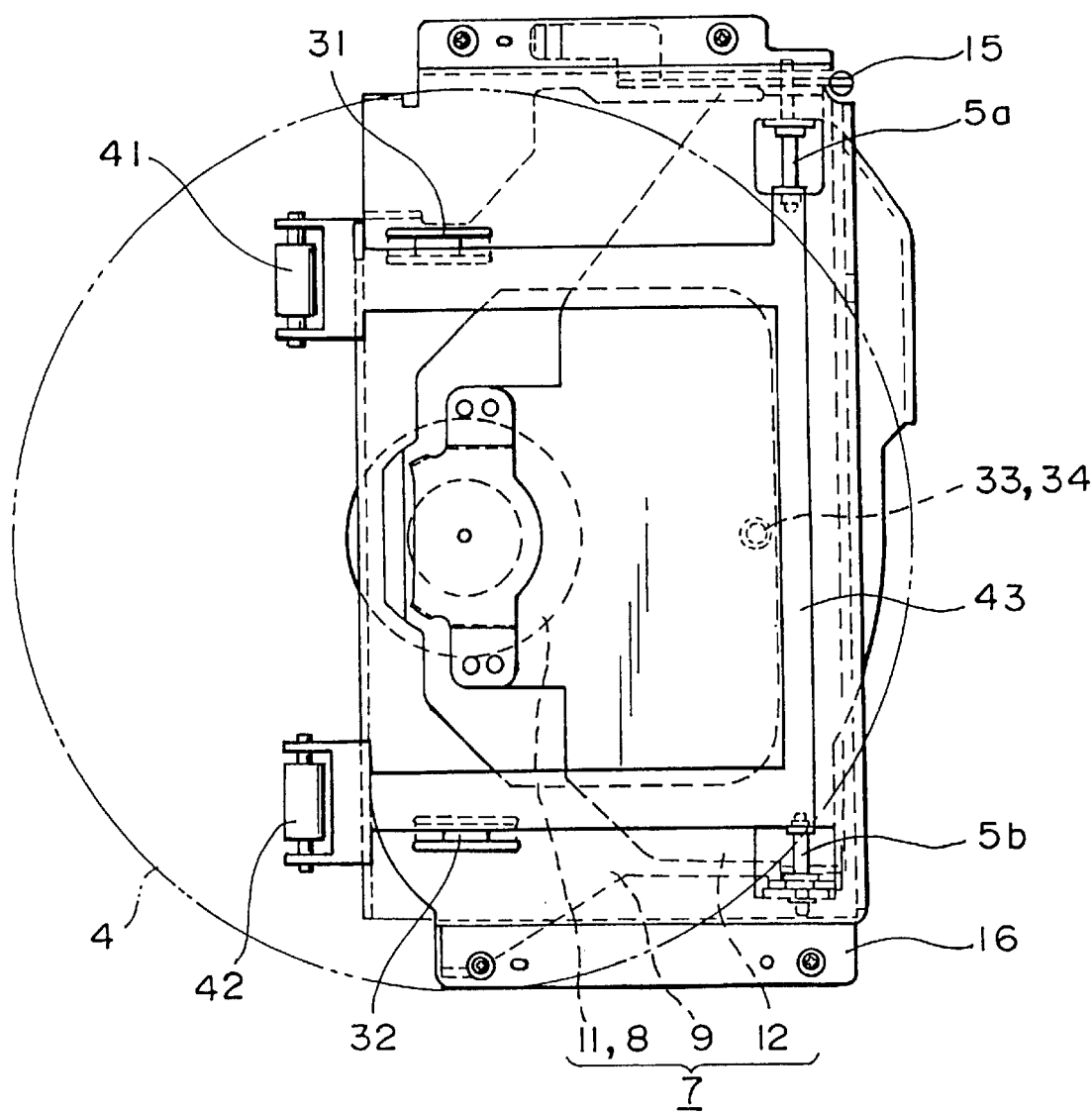
FIG.8 is a plan view of a third embodiment of a disk apparatus in accordance with the present invention, particularly illustrating a plurality of main members which are located at their initial position.

FIG. 8 is a plan view of a one of the embodiments applied as a third embodiment of a disk apparatus in accordance with the present invention, particularly schematically illustrating a plurality of main members which are located at their initial position. FIGS. 9A and 9B are side views of the disk apparatus shown in FIG. 8 in a disk loading state and a disk clamping state, respectively. As the present embodiment substantially has a similar configuration to that of the second embodiment, only the points which are different from the second embodiment will be described below.

Referring to FIG. 8, in the present embodiment, a disk control member 43 having a disk control rollers (disk control sections) 41, 42 are provided at a position overlapping an upper plate 16 and rotatably mounted to the upper plate 16 via axes 5a, 5b. This disk control member 43 in which a pair of arms project in parallel from both ends of a line which extends along the axes 5a, 5b is generally shaped like a letter "U". The pair of the arms projects from the both ends generally across the upper plate 16, and disk control rollers 41 and 42 are provided at the ends of the projected arms, respectively.

In this case, as shown in FIG. 9A and 9B, the disk control member 43 is configured to operatively cooperate with the drive plate 10 and rotate in the same direction same as the drive plate 10. As shown in FIG. 9A, in accordance with this cooperative configuration, when the drive plate 10 is located at a lower position, the disk control member 43 is also located at a lower position and the disk control rollers 41, 42 provided at the ends thereof butt against the upper main surface of the disk 4, and the rollers 41, 42 rotate as the disk 4 moves horizontally in order to guide the disk 4 to a chucking allowable position on the playback unit 7. On the other hand, as shown in FIG. 9B, when the drive plate 10 is located at an upper position, the disk control member 43 is also located at an upper position, and the disk control roller 41, 42 provided at the ends thereof are held in their upper position at some distance from the chucked disk 4. Other components such as the disk control sections 31 to 34 and the like are configured quite same as those of the abovementioned second embodiment.

[Operation]

In accordance with the present embodiment having the configuration as mentioned above, the disk 4 can be guided by the disk control rollers 41, 42 with pressing the upper main surface of the disk 4 during the disk loading operation. That is, the disk rollers 41, 42 can compulsively press the upper main surface of the disk 4 in the proper horizontal direction during the disk loading operation. Accordingly, in combination with the effect of the disk control sections 31 to 34, the position of the main surface of the disk 4 can be more precisely controlled and the inclination of the disk 4 can be kept within a range in which a reliable chucking operation is ensured. Therefore, when the combination of the conventional shape turntable 8 and clamper 11 is used, the disk 4 can be engaged with the disk engaging section 8a of the turntable 8 without trouble and consistently reliable disk chucking operation is ensured.

Particularly, in accordance with the present embodiment, the disk control rollers 41, 42 can control the position of the disk with the part thereof projected from the playback unit 7 as well as the part thereof received in the playback unit 7, therefore, the position of the disk 4 can be certainly controlled using a larger area of the disk 4. Further, as the disk control rollers 41, 42 also serve as means for guiding the main surface of the disk 4, more smooth disk loading operation is allowable.

[Effects]

As mentioned above, in accordance with the present embodiment, the position of the main surface of the disk 4 can be compulsively controlled in the proper horizontal direction during the disk chucking operation by the synergistic effect of the disk control sections 31 to 34 provided on the upper plate 16 or on the clamp arm 12 and the drive plate 10 and the disk control member 43 which is operatively associated with the drive plate 10, therefore consistently reliable disk chucking operation is ensured. Accordingly, as the positioning of the disk 4 in the vertical direction and horizontal direction can be performed easily and precisely, subsequent operations such as disk reproducing operation and disk recovering operation are also favorably implemented, thereby the operative reliability of the apparatus can be improved.

Modifications

The present invention is not limited to the abovementioned embodiments, and other various modifications may be made within the scope of the present invention.

First, in the respective abovementioned embodiments, the drive plate is mechanically locked and the clamp arm is driven with the biasing force of the spring, however, such a configuration that the clamp arm is mechanically locked and the drive plate is driven with the biasing force of the spring is also possible. In this case, as the turntable is drive with the spring biasing force, similar operations and effects can be given by providing a disk engaging section on the turntable.

Further, the disk control section of the present invention can be provided on any various fixed member fixed relative to the structure (lift unit or the like) including a playback unit or any various moving member as long as locating nearby the supporting member such as the clamp arm and the drive plate. Still further, as in the abovementioned third embodiment, it is also possible to provide a member for controlling a disk, and use the disk control section provided on the other member in combination.

Regarding this, specific shape, number and position of the disk control section and disk control member are optional. For example, in order to prevent the disk from being scratched by the disk control section, it is possible that the surface of the disk control section is covered with a resilient material, and the disk control section itself is made of a elastic material, or the like.

On the other hand, in the abovementioned second and third embodiments, the disk control sections are provided near the drive plate which is a mechanically locked supporting member as well as near the clamp arm which is a supporting member driven with the spring biasing force, however, the present invention is not limited thereto. That is, the disk control member does not necessarily require mechanically locked side. Sufficient operative effects can be given by at least providing the disk control member on the side which is driven with the spring biasing force. Accordingly, when the clamp arm is mechanically locked and the drive plate is driven with the spring biasing force as opposed to the configuration of the abovementioned embodiments, the disk control sections should be provided at least on the drive plate side.

Still further, in the present invention, specific configurations of the magazine and the magazine loading section, the disk playback section, the disk holding unit drawing means and the disk transporting member, the moving means, the chucking operation drive mechanism, and the like are optional. Still further, the present invention can be applied to various disk apparatuses such as a CD player, LD player, MD player, and in any case, superior effects as mentioned in conjunction with the respective embodiments in the foregoing are provided.

The disk apparatus which embodies the present invention can be applied to not only a disk apparatus of the type of using a magazine which can accommodate therein plural disks, but also a disk apparatus of the type not using a magazine if the magazine is based on the system in which the disk is. drawn out in the direction parallel to the main surface thereof and the disk transporting mechanism and the disk playback unit is substantially fixed, and similarly superior effects are provided.

Now the description of the embodiments in accordance with the third and fourth aspects of the present invention is given with referring to the drawings. The disk apparatuses in accordance with the following embodiments comprise a turntable for rotating a disk mounted thereon, clamper for clamping and hold the disk in cooperation with the turntable and a playback unit comprising a pickup for detecting a signal from the disk and the like, a transporting mechanism for transporting the disk holder between the disk magazine and the turntable, an electronic circuit such as a control circuit for giving a operation command to various components in response to the prescribed button operation of the user to control the same, a disk magazine loading section, a disk magazine ejecting mechanism, and the like, all of which can be configured in accordance with various known technologies, and the description and illustration thereof are simplified or omitted.

Fourth Embodiment

The disk apparatus in accordance with the third aspect of the present invention is described as a fourth embodiment of the present invention with reference to FIG. 13 to FIG. 23.

[Configuration]

Figure 13:
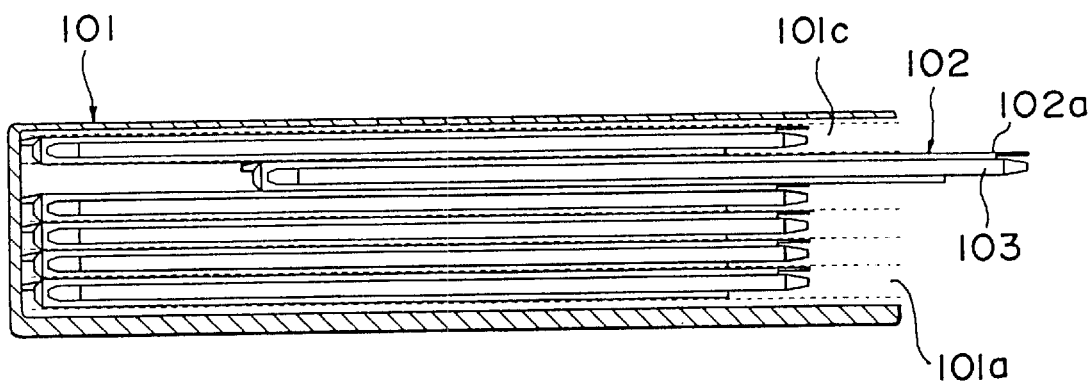
FIG. 13 is a sectional side view of a disk magazine which is incorporated into the other embodiment of the disk apparatus of the present invention.
Figure 14:
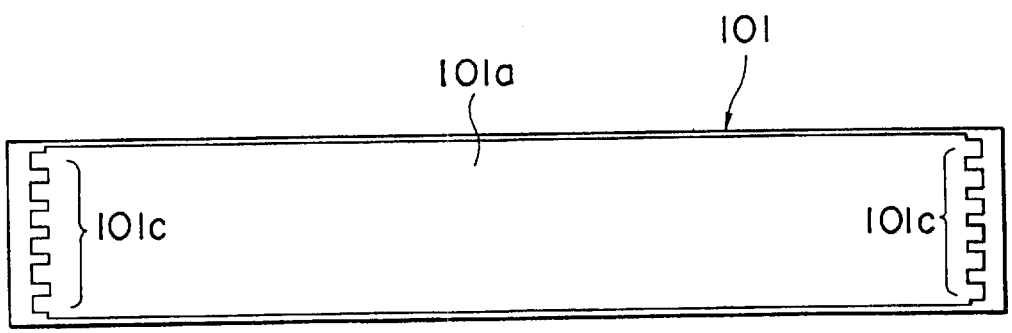
FIG. 14 is a front view of the disk magazine shown in FIG. 13.

First, a description is given to the configuration of the present embodiment. As shown in FIG. 13 and FIG. 14, a plurality of grooves 101c is horizontally formed in left and right inner surfaces of a box-like disk magazine 101. Both ends of a disk holder 102 are inserted into the grooves 101, thereby the disk magazine 101 accommodates a plurality of so the disk holders 102 arranged in a stack configuration. One side of the disk magazine 101 comprises an opening 101a through which disk holders 102 can be freely inserted or drawn out in the horizontal direction.

The disk holders 102 are thin plate members each of which holds therein one disk. Each of the disk holders 102 is configured to allow insertion and removal of a disk 103 through one side (right side in FIG. 13) of the holder in the direction parallel to the main surface of the disk 103. As shown in FIG. 13, a guide piece 102a made thinner than other parts is provided at a front end of a disk inserting section 103 of the disk holder 102.

Figure 15:
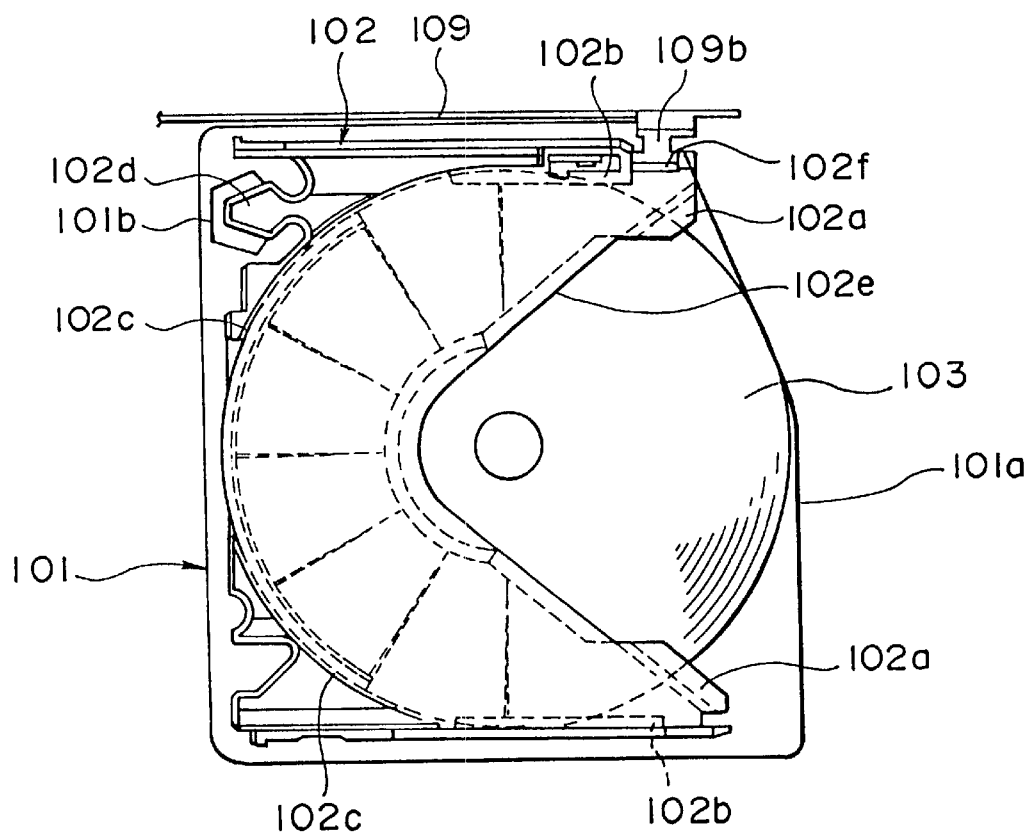
FIG. 15 is a perspective plan view of the embodiment shown in FIG. 13, illustrating a playback standby state in the operating process.
Figure 16:
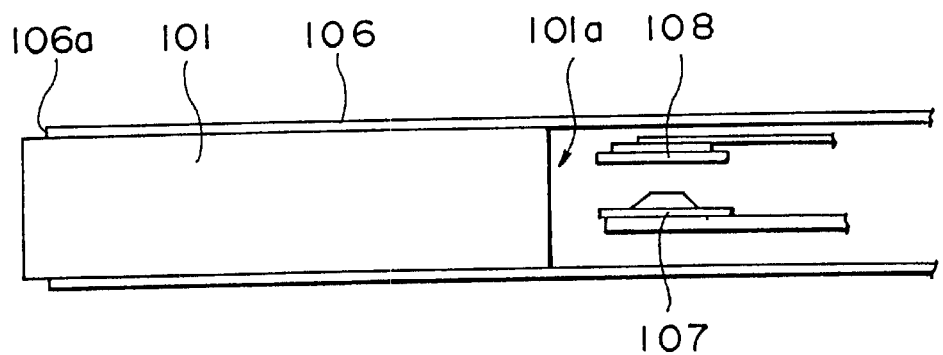
FIG. 16 is a sectional side view of the embodiment shown in FIG. 13, illustrating a playback standby state in the operating process.

The disk holder 102 further comprises a generally V-shaped or U-shaped cutout which reaches to the center of the accommodated disk 103 as shown in FIG. 15. A gripping section 102b having generally U-shaped cross section for gripping the inserted disk 103 is provided on the both sides (upper and lower sides in FIG. 14) of the disk holder 102, and a stopper 102c of a circular-arc protuberance against which the disk 103 butts is provided on the inner back side (left side in FIG. 14) of the disk holder 103.

This disk holder 102 covers the upper surface of the disk 103 with a flat plate having a cutout 102e. The lower side of the disk holder 102 is shaped so that the lower surface of the disk 103 is open to the outside except the gripping section 102b, and a guide piece 110 is also provided on a flat plate side of the disk holder 102. This is because, as described below, the present embodiment is configured to clamp the disk 103 between the turntable and the clamper, the disk 103 easily moves when releasing the disk, and this movement is prevented by the flat plate of the disk holder 102. This is further because the recording surface of the disk 103 is not scratched if the upper surface of the disk 103 contacts against the flat plate of the disk holder 102 as the recording surface of the disk 103 is facing downward in FIG. 13.

On the other hand, the disk magazine comprises generally C-shaped clipping sections 101, the number of which is corresponding to the number of disk holders 102 to be accommodated, on the inner wall opposed to the opening 101a thereof. Tufted engaged sections 102d having a necking with which a tip of the clipping section 101b engages are formed at positions corresponding to the clipping sections 101b.

Figure 17:
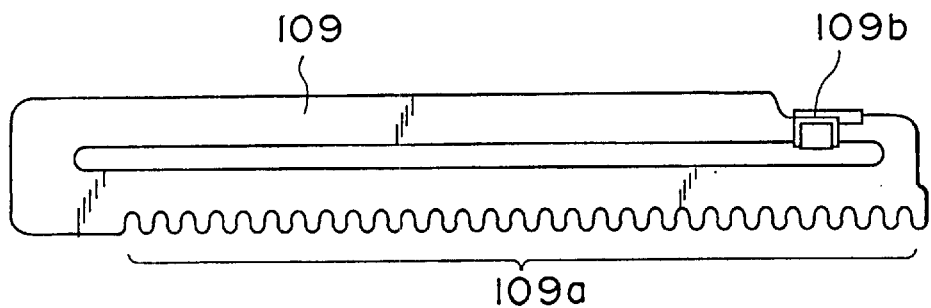
FIG. 17 is a side view of a plate of a transporting mechanism of the embodiment shown in the FIG. 13.
Figure 19:
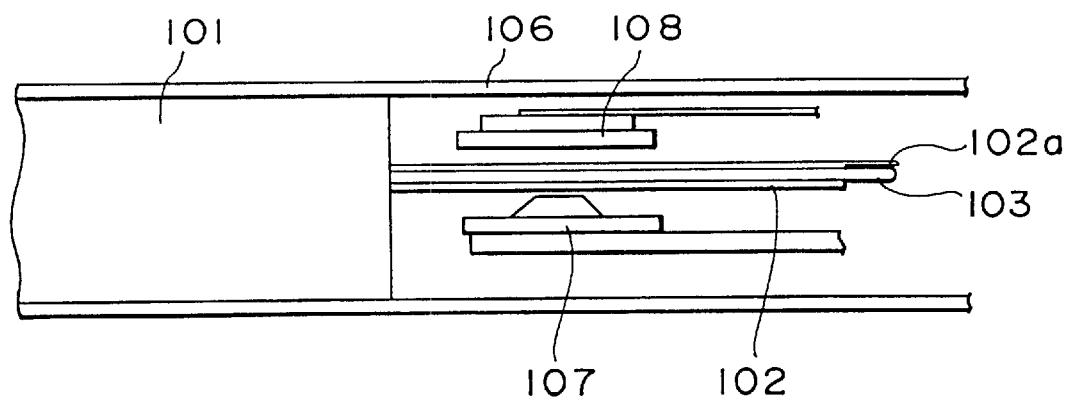
FIG. 19 is a sectional side view of the embodiment shown in FIG. 13, illustrating a disk transporting state in the operating process.
Figure 20:
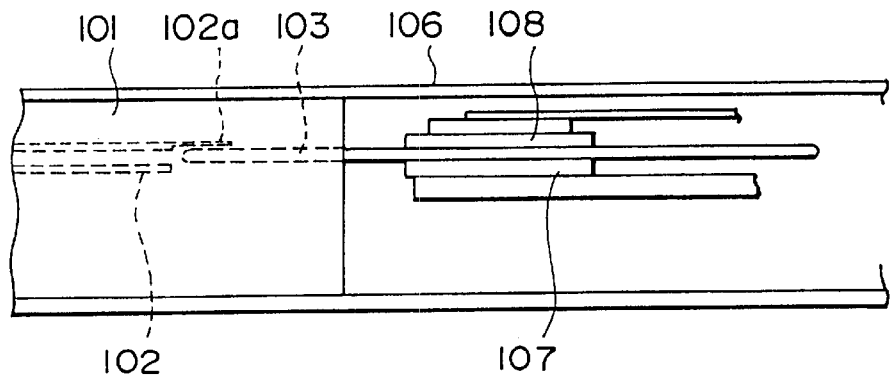
FIG. 20 is a sectional side view of the embodiment shown in FIG. 13, illustrating a disk reproducing state in the operating process.

The disk magazine 101 accommodating the disk holder 102 in the foregoing is configured to be inserted to the loading section 106a of the housing 106 of the disk apparatus from the opening 101a side thereof and installed in the housing 106. The housing contains a turntable 107 and clamper 108 between which a disk 103 is clamped from upper and lower sides. The turntable 107 and the damper 108 is vertically movably provided by a driving mechanism not shown, and components such as a pickup and the like necessary for reproducing a disk are disposed around the turntable 107 and the clamper 108. In FIG. 17, FIG. 19, and FIG. 20, the relative size of the turntable 107 and the damper 108 to the disk magazine 101 and the housing 106 are illustrated larger than actual.

Figure 18:
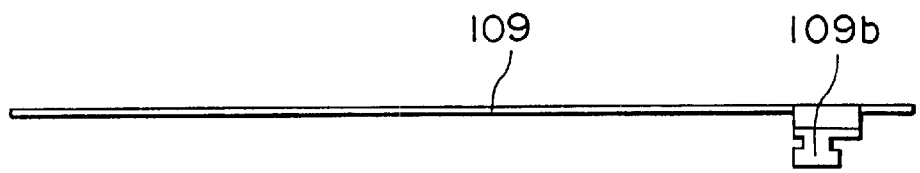
FIG. 18 is a plan view of the plate shown in FIG. 17.

The disk holder 102 in the disk magazine 101 installed in the housing 106 is movably mounted by means of the transporting mechanism so as to be able to move to and from the turntable 107. As shown in FIG. 17 and FIG. 18, the transporting mechanism having a rectangular plate 139 including thereon a horizontal rack 109 is movably provided in the vertical direction by means of a driving mechanism in accordance with the height of each of disk holders 102. The plate 109 is movably provided in the horizontal direction by engaging a pinion of a motor not shown with the rack 109a thereof. Further, a lug 109b is provided at an end of the plate 109. As shown in FIG. 15, the lug 109b is shaped to be engageable with the U-shaped hook 102f which is formed at an inserting side end of the disk holder 102.

With the transporting mechanism as mentioned above, the disk holder 102 is transported to the turntable 107 as shown in FIG. 19, and the disk 103 is clamped between the damper 108 and the turntable 107 as shown in FIG. 20, then the empty disk holder 102 is returned into the disk magazine 101 leaving the disk 103. At this time, the holder 102 is set to be positioned with the end of the disk 103 on the side held on the turntable 107 and a guide piece 102a overlapping without contacting (hereinafter, referred to as "overlap").

[Operation]

Figure 23:
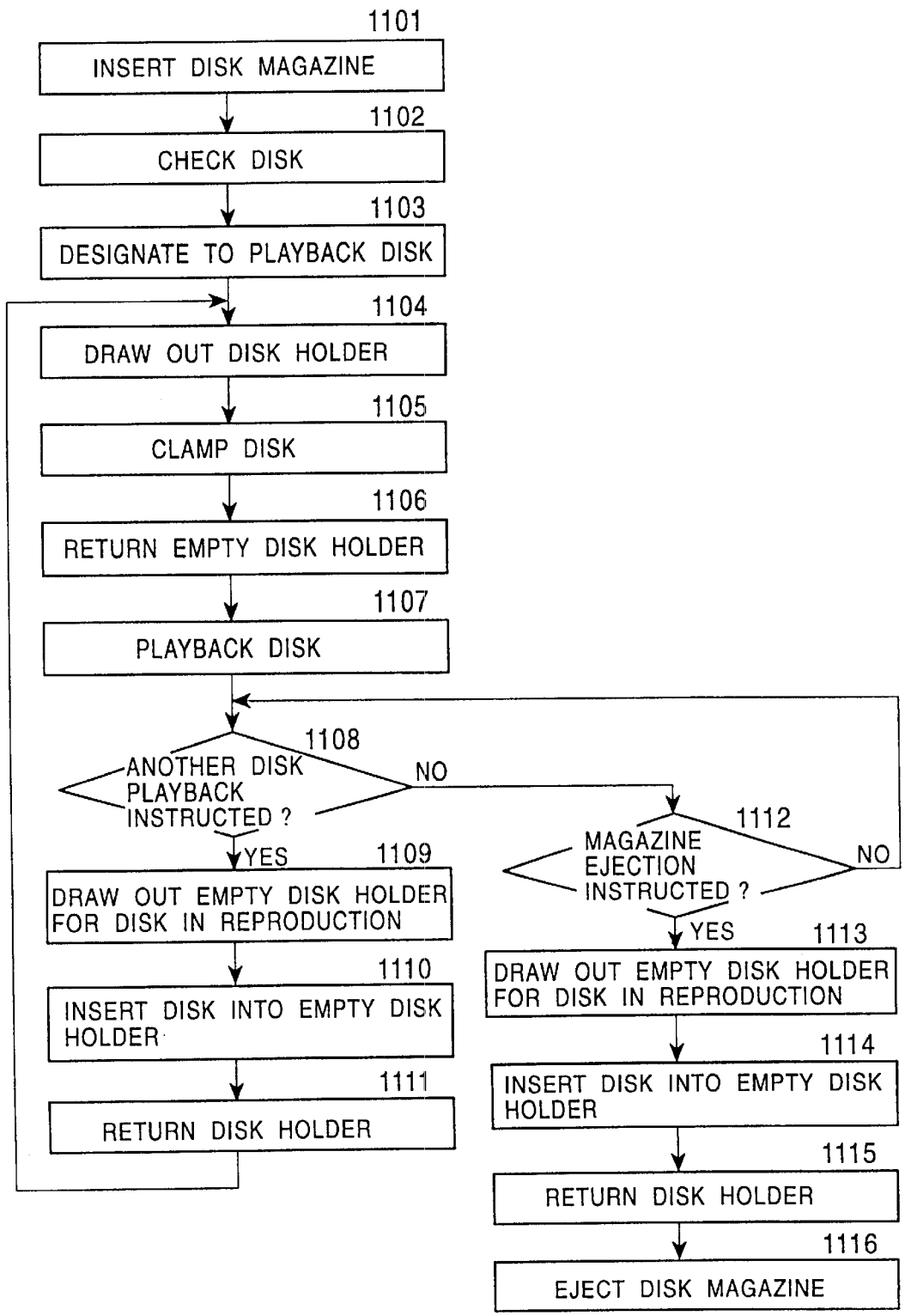
FIG. 23 is a flowchart used for explaining the operating steps of the embodiment of the present invention.

The operation of the present embodiment configured as mentioned above will be described below in conjunction with FIGS. 13 to 22 and a flowchart of FIG. 23. After the user inserts disks 103 into respective disk holders 102 in the disk magazine 101 until each disk 103 contact against the stopper 102a, the disk magazine 101 is loaded in the housing 18 of the disk apparatus as shown if FIG. 16 (Step 1101). Then a circuit of the disk apparatus checks which disk holder 102 accommodates a disk 103 in the magazine 101 (Step 1102). When the user selects a desired disk 103 and press a playback button of the disk apparatus, reproduction of the disk 103 is instructed (Step 1103).

Figure 21:
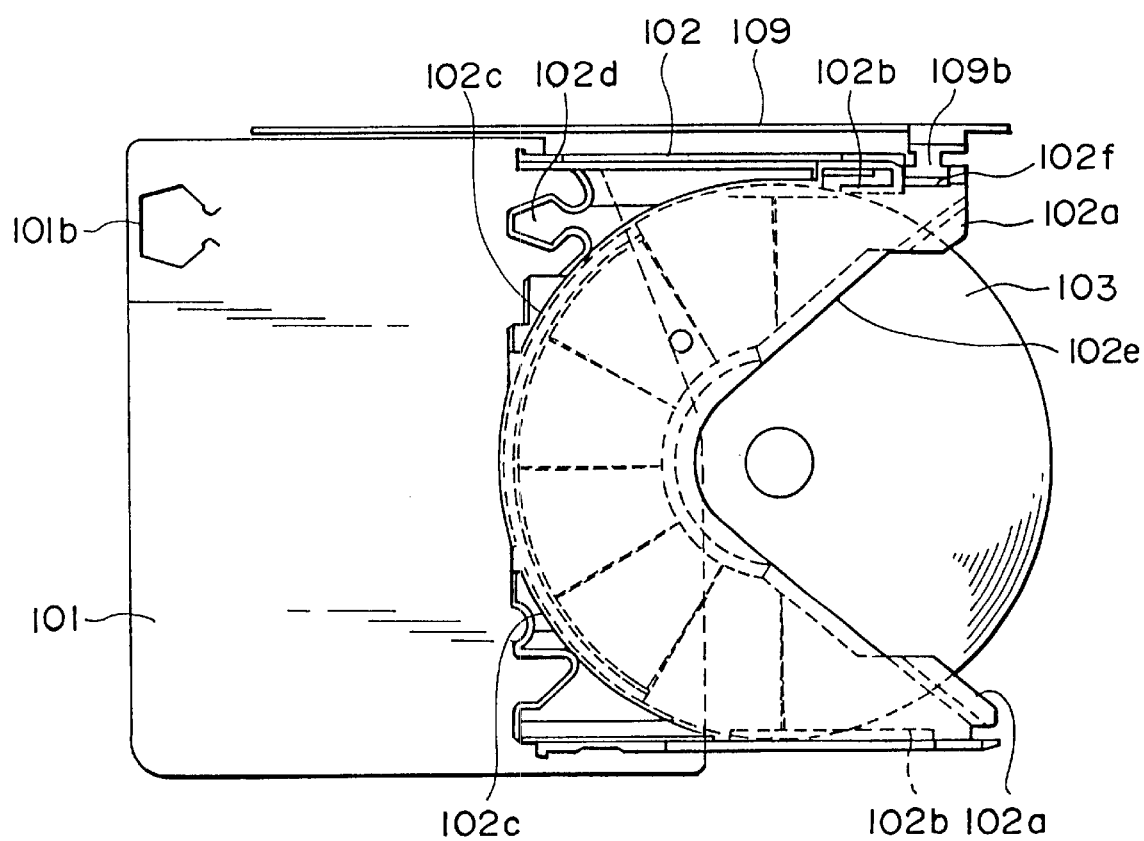
FIG. 21 is a perspective plan view of the embodiment shown in FIG. 13, illustrating a disk transporting state in the operating process.
Figure 22:
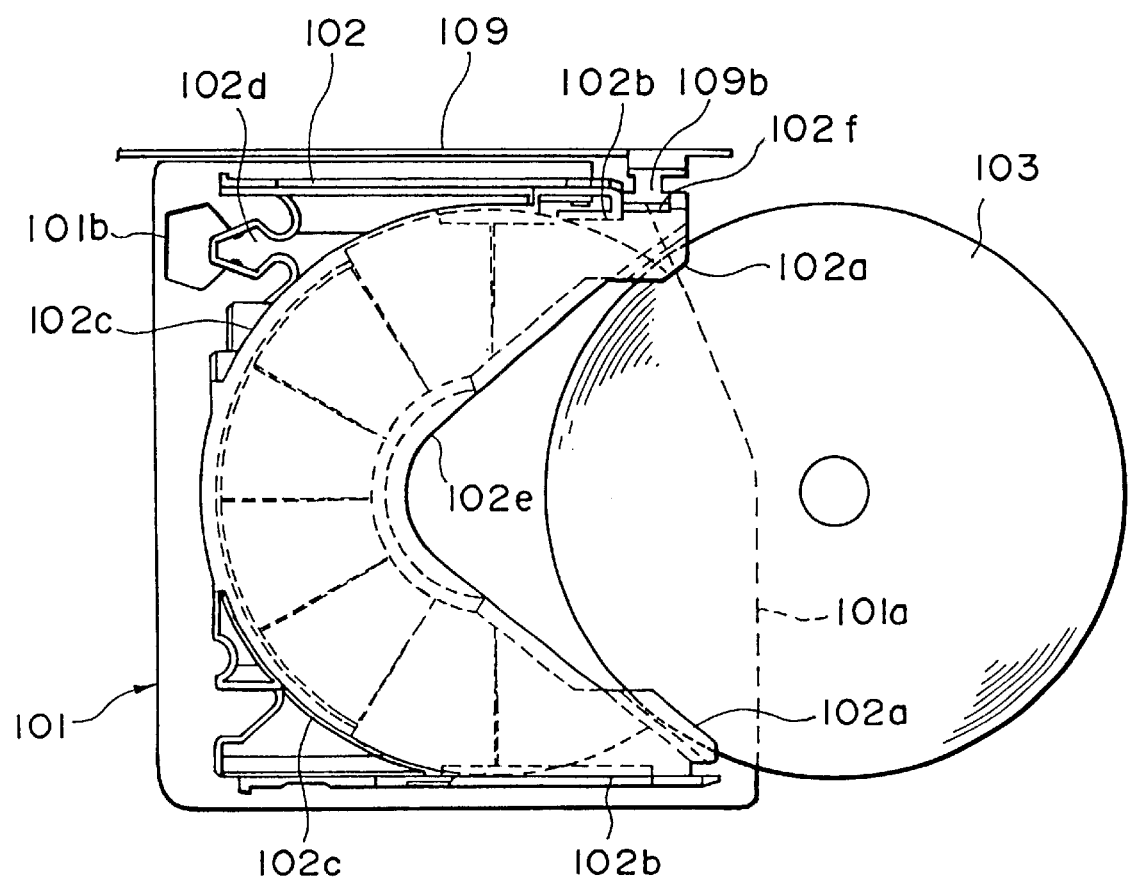
FIG. 22 is a perspective plan view of the embodiment shown in FIG. 13, illustrating a disk reproducing state in the operating process.

Next, the playback apparatus comprising the plate 109 and the turntable 107 in the transporting mechanism moves up and down to the disk holder 102 which accommodates therein the selected disk 103, and the lug 109b of the plate 109 engages with the hook 102f of the disk holder 102. As the plate 109 moves toward the turntable 109 by means of a pinion which is rotated by a motor, the disk holder 102 is drawn out toward the turntable 107 as shown in FIG. 19 and FIG. 21 (Step 1104), the center portion of the exposed disk 103 through the cutout 102e of the disk holder 102 is placed on the turntable 107, and the disk 103 is clamped between the turntable 107 and the damper 108 (Step 1105).

After that, as shown in FIG. 20, the drawn disk holder 102 is retracted toward the disk magazine 101 by the transporting mechanism with the disk 103 left on the turntable 107 (Step 1106), thereby the disk 103 is relatively drawn out from the disk holder 102. At this time, the disk holder 102 is not completely returned into the disk magazine 101, and positioned with the end of the disk 103 mounted on the turntable 107 and the guide piece 102 overlapping.

The disk 103 is reproduced on the turntable 107 in the state as mentioned above (Step 1107), however, the guide piece 102a does not contact with the disk 103 in reproduction because the guide piece 102a is formed of a thin wall. After completion of the reproduction, if the user selects another disk 103 and press the playback button, the instruction to select another disk is given (Step 1108). Then the empty holder 102 in the standby state with the end of the disk 103 on the turntable 107 overlapping the guide piece 102a is drawn out again toward the turntable 107 (Step 1109), and the disk 103 after completion of the reproduction is inserted into the drawn empty disk holder 102 (Step 1110).

At this time, as the end of the disk 103 overlaps the guide piece 102, if the deformation or displacement of the disk 103 on the turntable 107 is encountered, the disk 103 is controlled by causing the displaced end to come into contact with the guide piece 102. Therefore, the end of the disk 103 is not allowed to come off the inserting section. In addition, the guide piece 102a is formed from a thin wall, as a result, the clearance of the inserting can be made larger and the possibility of contacting with the disk 103 can be minimized.

After the disk 103 is entirely accommodated in the disk holder 102, clamping of the turntable 107 is released, and the disk holder 102 is brought back by the transporting mechanism until the clipping section 101b engages with the engaged section 102d (Step 1111). Subsequently, the disk holder 102 accommodating a newly selected disk 103 is drawn out (Step 1104) and the disk 103 is reproduced by similar procedures as mentioned above (Steps 1105 to 1107).

Further, a disk magazine ejection button is pressed by the user, an instruction to eject the disk magazine is supplied to the circuit in the disk apparatus (Step 1112). Then the empty disk holder 102 in the standby state with the end of the disk 103 on the turntable 107 overlapping the guide piece 102a is drawn out again toward the turntable 107 (Step 1113), and the disk 103 after completion of the reproduction is inserted into the drawn empty disk holder 102 (Step 1114). After the disk 103 is entirely accommodated in the disk holder 102, clamping of the turntable is released, and the disk holder 102 is brought back toward the disk magazine 101 by the transporting mechanism until the clipping section 101b engages with the engaged section 102d (Step 1115). Subsequently, the disk magazine 101 is ejected from the disk apparatus by the ejecting mechanism (Step 1116).

[Effects]

Effects of the abovementioned present embodiment is as follows. That is, if the disk 103 on the turntable 107 is displaced, the end of the disk 103 is not allowed to come off the inserting section, and the disk 103 is ensured to be returned in the disk holder 102. Accordingly, the disk is prevented from the trouble such as damage or the like which may be caused when the disk 103 is displaced and contacts against some part of the inside of the apparatus, and the reliability of the disk apparatus is improved.

Particularly, as the guide piece 102a is formed from a thin wall, as a result, the clearance of the inserting can be made larger, therefore, the disk 103 is prevented from scratching which may be caused when the end of the disk 103 in reproduction contacts against a portion of the inserting section where the end of the disk overlaps, and a situation that the rotation of the disk 103 is interfered is resisted, accordingly, failed reproduction like a skipping can be prevented and the reliability of the disk apparatus is improved.

Fifth Embodiment

Figure 24:
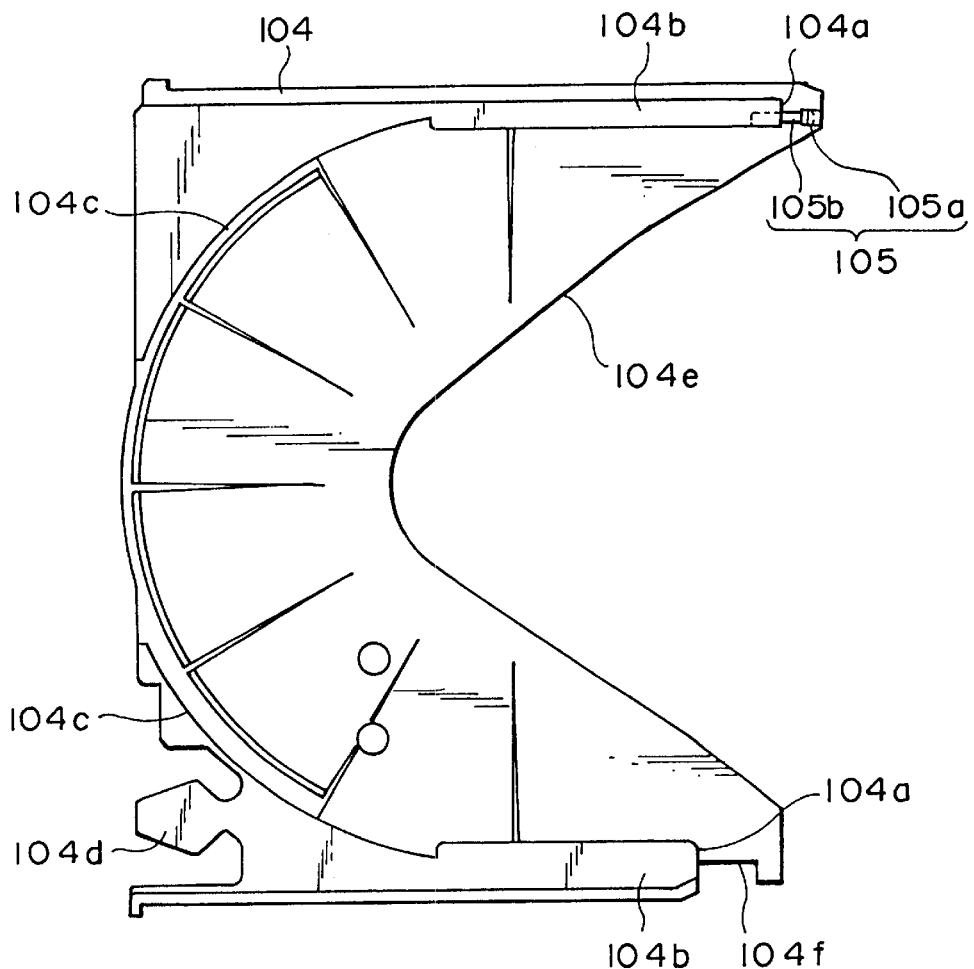
FIG. 24 is a bottom plan view of the disk holder of the second embodiment of the present invention.
Figure 25:
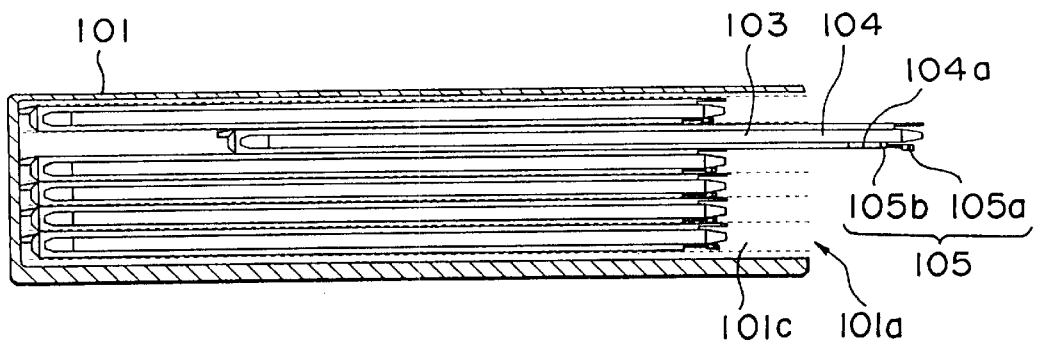
FIG. 25 is a sectional side view of the disk holder shown in FIG. 24.

The disk holder in accordance with the fourth and fifth aspects of the present invention is described as a fifth embodiment of the present invention with referring to FIG. 24 and FIG. 25. In figures, similar members to those in the fourth embodiments are designated by the same reference and omitted from the following description.

[Configuration]

First, a description is given to the configuration of the present embodiment. Referring to FIG. 24, a disk holder 104 comprises a cutout which reaches to the center of the disk fib 103 as in the case of the disk holder 102 of the fourth embodiment, and further comprises a gripping section 104b for gripping a disk 103, a stopper 104c, and a hook 104f.

A guide member 105 is mounted on an inserting section 104a through which the disk 103 located at the gripping section 104b is inserted. The guide member is provided with a butting section 105a as shown in FIG. 25 at a tip thereof, and biased in the direction of opening outward (downward in the figure) by the resilient member 105b. The guide member 105 is configured as follows: when the disk holder 104 is accommodated in a disk magazine 101, the butting section 105a of the guide member 105 butts against grooves 101c (shown in FIG. 25 and FIG. 14) formed in a left and right inner surfaces of the disk magazine 101 or butts against the upper surface of another disk holder 104, and therefore narrows inward (upward in FIG. 25) to hold the end of the disk 103.

[Operation]

The operation of the present embodiment as mentioned above is as follows. Besides, similar procedures to those in the fourth embodiments in the foregoing are omitted from the following description. After completion of the reproduction of the disk 103 on the turntable, if an instruction to produce another disk 103 or an instruction to eject the disk magazine 101 is provided, then the empty disk holder 104 is drawn out toward the turntable 107 by the transporting mechanism and the disk 103 after completion of the reproduction is inserted into the drawn disk holder 104. At this time the guide member at a tip of the drawn disk holder opens outward by the biasing force of the resilient member 105b, therefore the clearance of the inserting portion 104a vertically opens, accordingly, if the disk 103 is vertically displaced, the end of the disk 103 is not allowed to come off the inserting section 104a.

After the disk 103 is entirely accommodated in the disk holder 104, clamping of the turntable 107 is released, and the disk holder 104 is brought back toward the disk magazine 101 by the transporting mechanism until the clipping section 101b engages with the engaged section 102d. At this time, as the butting section 105a butts against the groove 101c of the disk magazine 101, the guide member 105 is closed. Accordingly, the disk holder 102 is accommodated in the disk magazine 101 with the clearance of the inserting section 104a narrowed, and one end of the disk 103 is supported by the butting section 105a of the guide member 105.

[Effects]

Effects of the abovementioned present embodiment is as follows. That is, the guide member 105 opens and the clearance of the inserting section 104a vertically expanded when inserting the disk into the disk holder 104, therefore, if the disk 103 is vertically displaced, the end of the disk 103 is not allowed to come off the inserting section, and the disk 103 is ensured to be returned in the disk holder 102. Accordingly, the disk is prevented from the trouble such as damage or the like which may be caused when the disk 103 is disengaged and contacts against some part of the inside of the apparatus and the reliability of the disk apparatus is improved.

The guide member 105 closes when the disk holder 104 is accommodated in the disk magazine 101 and the inserting section 104a does not open, therefore each of the disk holders 104 does not become thick. There is no need to enlarge the disk magazine 101 in the disk holder stacking direction for accommodating therein multiple disk holders 104 arranged in stack, and, as a result, the disk apparatus is prevented from upsizing in its entirety.

The present invention, the abovementioned guide member may have a butting portion which butts against another disk holding unit or the inside of the disk magazine, thereby narrowing the inserting portion.

In the case where the guide member as mentioned above is used, the inserting portion is narrowed by the butting portion when the disk holding unit is accommodated in the disk magazine, thereby the butting portion prevent the disk from popping out of the disk holding unit.

The guide member 105 closes when the disk holder is loaded in the disk magazine 103, and the butting section 105z thereof supports the disk 103, therefore, the disk 103 accommodated in the disk holder 104 is prevented from popping out of the holder because of the vibration and the like, consequently, the reliability of the apparatus is improved.

In addition, the guide member 105 automatically closes by virtue of the resilient member 105b when the disk holder 104 is accommodated in the disk magazine 101, and automatically opens when the disk holder 104 is drawn from the disk magazine 101. Thus the disk holder 104 can open and close without specifically equipped with a complex mechanism, therefore the extra manufacturing cost is not required and a failure is seldom produced.

Other Embodiments

The present is not limited to the embodiments as mentioned above, and the shape, number, and the like of each member may be changed as necessary. For example, the supporting surface of the disk holder is not necessary to be limited to the disk upper side as mentioned above, the disk holder may support the disk from the lower side thereof, or from both upper and lower sides thereof. The thin guide piece 102a in accordance with the abovementioned first embodiment is not limited to be provided at the upper side of the disk, and may be provided at the lower side or at the both upper and lower sides thereof, and further the guide piece 102 may be omitted.

On the other hand, the butting section 105a of the guide member 5 of the abovementioned firth embodiment is not necessarily required to be provided with, the guide member 105 may be formed of a simple small piece. The effect as mentioned above can be provided if the small piece is made of a resilient material. The resilient member 105b may be made of resin or metal. While the above mentioned fifth embodiment has the two inserting sections 104a of the disk holder 104, the reliability of the disk inserting operation is increased when the guide member 105 is mounted to each of the inserting sections 104a. Further, the guide member 105 may be configured to be opened by the mechanism for drawing out the disk holder 104.

On the other hand, an invention is allowable which is configured to ensure the reliability of the disk inserting operation by combining the disk apparatus of the fourth embodiment and the disk magazine of the fifth disk magazine by providing the guide member of the fifth embodiment at the inserting section 102a of the fourth embodiment.

Still further, the number of the disk holders that the magazine can accommodate therein is not limited to the number illustrated in the drawings of the abovementioned embodiments, the number may be optionally increased and decreased during designing. The mechanism for loading the disk holder into the disk magazine is not limited to that inserting into a groove. The shapes of the clipping section of the disk magazine and the engaged section of the disk holder are not also limited to the shapes of the embodiments in the foregoing. Further, the present invention may be applied to the disk magazine which does not have a disk magazine. For example, it is possible to form a guide groove of the disk holder in the disk apparatus, and load and unload a disk to and from the disk holder which is inserted in the guide groove. The number of the disk holder that the magazine can accommodate may be one or more.

Still further, the playback means of the disk apparatus may be recording means or recording and reproducing means, and for the other mechanisms such as a transporting mechanism, electronic circuits, or the like of the disk apparatus, know components may be used. For example, while the abovementioned embodiments are configured so that the disk is relatively drawn out of the disk holder by moving the disk holder, the disk apparatus of the present invention may be configured so that the disk is move or both of the disk holder and the disk move. Still further, the present invention may support any disk irrespective of the size thereof as long as it is a circular plate type recording medium.

[Effects of the Invention]

As described above, in accordance with the present invention, a disk apparatus which can reliably return a disk located at a reproducing or recording position to a disk holder without having to upsize the disk apparatus can be provided.

Further, in accordance with the present invention, a disk holder which can ensure reliable disk inserting operation without increasing in size can be provided.

While the present invention has been described in detail as related to the embodiments, the descriptions of these embodiments are not intended to limit the scope of the present invention, and it is to be understood that various changes and modifications may be made in the present invention without departing from the scope of the appended claims.

What is claimed is:

1. A disk apparatus, comprising:
   a disk playback section having a first supporting member and a second supporting member, the first supporting member having a first rotating member for rotating a disk and supporting a spindle motor for rotating the first rotating member, the second supporting member having a second rotating member for clamping a disk in cooperation with said first rotating member;
   a chucking operation drive mechanism which drives one of said first and second supporting member in the chucking direction with a biasing force of a spring and mechanically locks another one of said first and second supporting member in a chucking position, thereby allows said first and second rotating members to clamp the disk therebetween; and
   a disk transporting member for guiding a disk to a region between said first and second rotating members,
   wherein one of said first and second rotating members which is provided at the supporting member which is driven with said spring biasing force has a disk engaging section comprising an outer wall and an inner wall, the outer wall having a diameter which is approximately same as the disk inner diameter in order to engage in the inner diameter of the disk, the inner wall being formed inside of the outer wall; and further wherein another of said first and second rotating members which is provided at the mechanically locked supporting member has a projection which is adapted to project through the inside of the inner wall of said disk engaging section.

2. A disk apparatus, comprising:

magazine loading section to which a magazine is installed, the magazine being able to accommodate a plurality of disk holding units in an arrangement such that any disk holding unit can be drawn out independently, the disk holding unit accommodating a disk inserted in the direction parallel to the main surface thereof;

a disk playback section having a first supporting member and a second supporting member, the first supporting member having a first rotating member for rotating a disk and supporting a spindle motor for rotating the first rotating member, the second supporting member having a second rotating member for clamping the disk in cooperation with said first rotating member;

holding unit drawing means for drawing out a specified disk holding unit from the magazine loaded in said magazine loading section and guiding the disk accommodated in the disk holding unit to the region between said first and the second rotating members;

moving means for moving said holding unit drawing means in the direction of arranging the disk holding units in the magazine; and a chucking operation drive mechanism which drives one of said first and second supporting member in the chucking direction with a biasing force of a spring and mechanically locks another one of said first and second supporting member in a chucking position, thereby allows said first and second rotating members to clamp a disk therebetween;

wherein one of said first and second rotating members which is provided at the supporting member which is driven with said spring biasing force has a disk engaging section comprising an outer wall and an inner wall, the outer wall having a diameter which is approximately same as the disk inner diameter in order to engage in the inner diameter of the disk, the inner wall being formed inside of the outer wall; and further wherein another of said first and second rotating members which is provided at the mechanically locked supporting member has a projection which is adapted to project through the inside of the inner wall of said disk engaging section.

3. A disk apparatus, comprising:

magazine loading section to which a magazine is installed, the magazine being able to accommodate a plurality of disk holding units in an arrangement such that any disk holding unit can be drawn out independently, the disk holding unit accommodating a disk inserted in the direction parallel to the main surface thereof;

a disk playback section having a first supporting member and a second supporting member, the first supporting member having a first rotating member for rotating a disk and supporting a spindle motor for rotating the first rotating member, the second supporting member having a second rotating member for clamping the disk in cooperation with said first rotating member;

holding unit drawing means for drawing out a specified disk holding unit from the magazine loaded in said magazine loading section and guiding the disk accommodated in the disk holding unit to the region between said first and the second rotating members;

moving means for moving said holding unit drawing means in the direction of arranging the disk holding units in the magazine; and a chucking operation drive mechanism which drives one of said first and second supporting member in the chucking direction with a biasing force of a spring and mechanically locks another one of said first and second supporting member in a chucking position, thereby allows said first and second rotating members to clamp a disk therebetween;

wherein a disk control section is provided at least in the vicinity of the supporting member which is one of the first and second supporting members which is driven by using the spring biasing force, the disk control section controlling the position of a main surface of the disk accommodated in the disk holding unit when the disk holding unit is drawn out to a position where the disk held in the disk holding unit can be chucked.

4. An apparatus in accordance with claim 3, said disk control section is provided at a part of a moving member which operates to move closer the main surface of the disk which is accommodated in the disk holding unit when the disk holding unit is drawn to the chucking allowable position of the disk accommodated in the disk holding unit.

5. A disk apparatus comprising:

a disk playback section having a first supporting member and a second supporting member, the first supporting member having a first rotating member for rotating a disk and supporting a spindle motor for rotating the first rotating member, the second supporting member having a second rotating member for clamping a disk in cooperation with said first rotating member, the first supporting member and second supporting member are pivoted about a common axis;

a chucking operation drive mechanism which drives one of said first and second supporting members in the chucking direction with a biasing force of a spring and mechanically locks another one of said first and second supporting members in a chucking position to thereby allow said first and second rotating members to pivot and clamp the disk therebetween; and a disk transporting member for guiding a disk to a region between said first and second rotating members, wherein one of said first and second rotating members which is provided at the supporting member which is driven with said spring biasing force has a disk engaging section comprising an outer wall and an inner wall, the outer wall having a diameter which is approximately the same as the disk inner diameter in order to engage in the inner diameter of the disk, the inner wall being formed inside of the outer wall and further wherein another of said first and second rotating members which is provided at the mechanically locked supporting member has a projection which is adapted to project through the inside of the inner wall of said disk engaging section.

\* \* \* \* \*